US006229402B1

United States Patent
Kataoka et al.

(12) United States Patent
(10) Patent No.: US 6,229,402 B1
(45) Date of Patent: May 8, 2001

(54) DRIVING CIRCUIT FOR VIBRATION TYPE ACTUATOR APPARATUS

(75) Inventors: Kenichi Kataoka; Shinji Yamamoto; Tadashi Hayashi, all of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/316,943

(22) Filed: May 24, 1999

(30) Foreign Application Priority Data

May 28, 1998 (JP) .................................. 10-147621
May 28, 1998 (JP) .................................. 10-147622

(51) Int. Cl.$^7$ .............................. H02N 2/06; H03L 7/099
(52) U.S. Cl. ........................ 331/34; 310/316; 318/114; 331/45; 331/154
(58) Field of Search .................. 331/34, 45, 154; 310/316, 317; 318/114, 116, 118

(56) References Cited

U.S. PATENT DOCUMENTS 5,013,982   5/1991   Sasaki ................................ 318/114
5,134,348 * 7/1992   Izukawa et al. .................... 318/116

* cited by examiner

*Primary Examiner*—Siegfried H. Grimm
(74) *Attorney, Agent, or Firm*—Fitzpatrick, Cella, Harper & Scinto

(57) ABSTRACT

A pulse forming circuit for a vibration type actuator apparatus. This circuit forms pulses by shifting an output from a frequency dividing circuit while changing the shift amount of a time delaying circuit using a ring oscillator for shifting an output from the frequency dividing circuit every time an output is generated by a frequency dividing circuit. With this arrangement, the actuator can be driven by using high-resolution pulse signals.

25 Claims, 37 Drawing Sheets

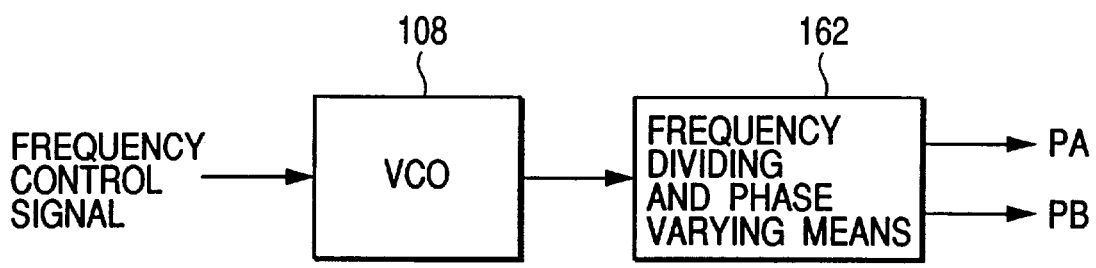
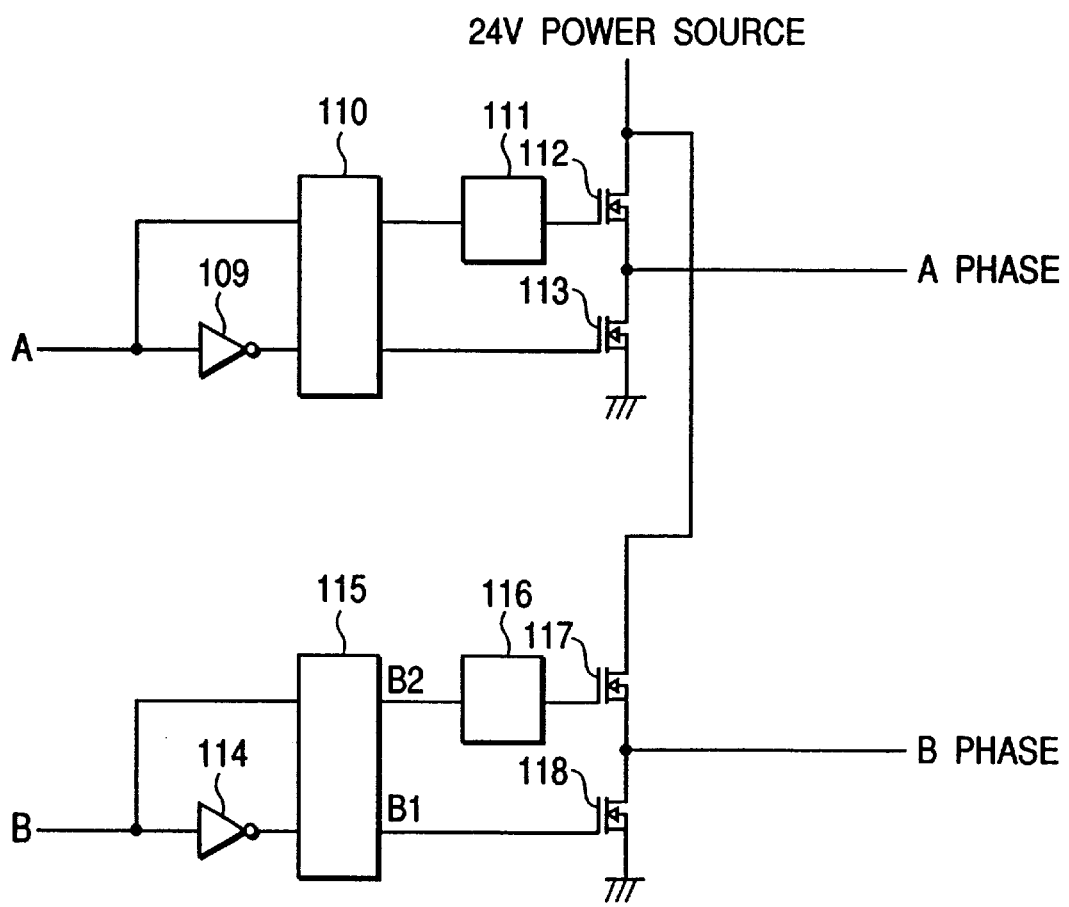

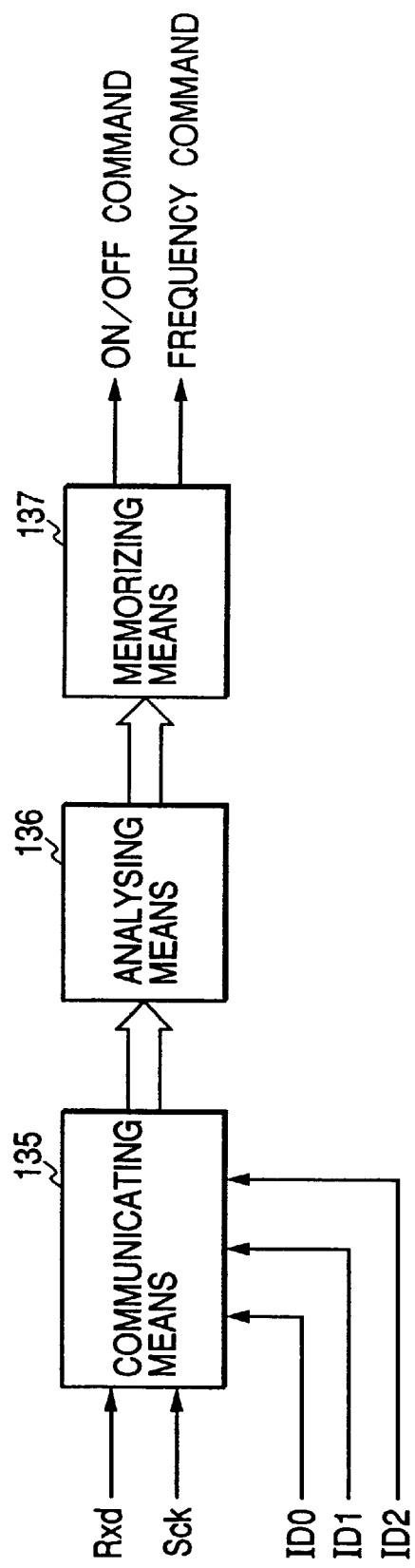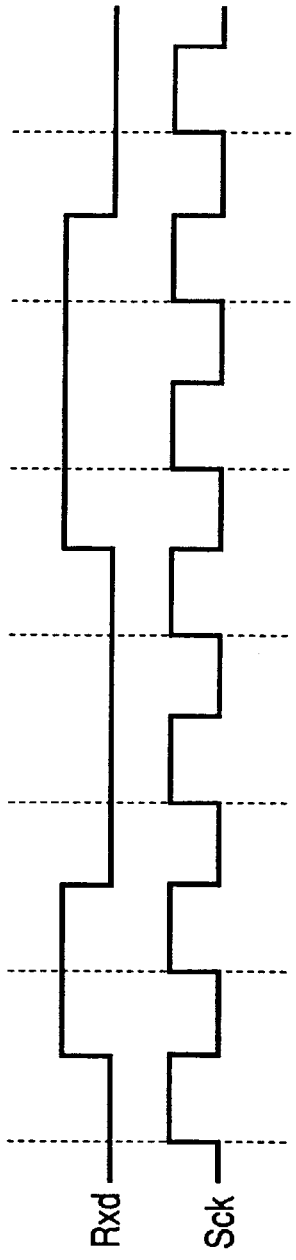

DRIVING CIRCUIT FOR VIBRATION TYPE ACTUATOR APPARATUS

BACKGROUND OF THE INVENTION

1. Field of the Invention

The present invention relates a driving circuit for a vibration type actuator and mounting of the driving circuit.

2. Related Background Art

Conventionally, as an oscillating means forming a driving circuit for a vibration type actuator, a means using a VCO or a means for frequency-dividing an high-frequency pulse signal and outputting the resultant signal has been used.

Since the frequency of such an analog oscillating means has a high temperature dependency, when the oscillating means is integrated with a power amplification means, the frequency precision decreases. A VCO using a quartz oscillator suffers a narrow frequency setting range. In addition, when frequencies are to be set by digitally dividing the frequency of the quartz oscillator, the resolution of the resultant frequencies is low. Such frequencies are unsuited to control the speed of a vibration type actuator.

Furthermore, a conventional driving circuit for a vibration type actuator is comprised of a combination of discrete electronic parts, and different parts are connected and used as a power amplification means, a CPU for controlling the operation of the vibration type actuator, an oscillating means, and the like.

Since a plurality discrete parts are used, a circuit board requires a large mounting area. In addition, since it takes much time to mount the parts on the circuit board, the manufacturing cost of the circuit board increases. Under the circumstances, the respective parts may be integrally mounted. As described above, however, since the frequency of the analog oscillating means has a high temperature dependency, if the oscillating means and the power amplification means are integrated, the frequency precision decreases. In addition, the VCO using the quartz oscillator suffers a narrow frequency setting range. It is therefore difficult to integrally mount these parts. Furthermore, if a circuit for setting frequencies by digitally dividing the frequency of a quartz oscillator is used, the problem of the temperature dependency can be solved. However, in a circuit using such a method, the resolution of frequencies is low, and hence this circuit is unsuited to control the speed of the vibration type actuator.

SUMMARY OF THE INVENTION

According to one aspect of the application, there is provided a pulse generating circuit for a vibration type motor, which can generate high-resolution frequencies by digital processing or a driving apparatus having the circuit.

According to one aspect of the application, there is provided a pulse signal forming circuit comprising a reference pulse generating circuit for generating a reference pulse signal, a frequency dividing circuit for outputting a pulse signal having a period of an integer multiple of a period of the reference pulse signal, and a time delaying circuit for generating a delayed pulse signal by changing a shift amount of an edge of a pulse signal from the frequency dividing circuit on the basis of delay data every time a pulse signal is output from the frequency dividing means, the time delaying circuit including pulse forming means for forming a plurality of pulses shifted from each other on a unit time basis and selecting means for selecting one of the pulses formed by the pulse forming means on the basis of delay data, wherein a pulse signal corresponding to a period of the selected pulse is formed as the delayed pulse signal.

According to one aspect of the application, there is provided a driving circuit in which the pulse forming circuit and power amplification means for amplifying power of a pulse signal from the pulse forming circuit are formed on one heat radiation means.

The above and other objects, features, and advantages of the present invention will be apparent from the following detailed description in conjunction with the accompanying drawings and the appended claims.

BRIEF DESCRIPTION OF THE DRAWINGS

FIG. 10 is a block diagram showing the arrangement of a pulse generating means in FIG. 9;

FIG. 11 is a block diagram showing an example of a half bridge circuit as an amplification means in FIG. 10;

FIG. 20 is a block diagram showing the arrangement of a control means in FIG. 19;

FIG. 21 is a timing chart showing input signals to a communicating means in FIG. 20;

DETAILED DESCRIPTION OF THE PREFERRED EMBODIMENTS

Figure 1:
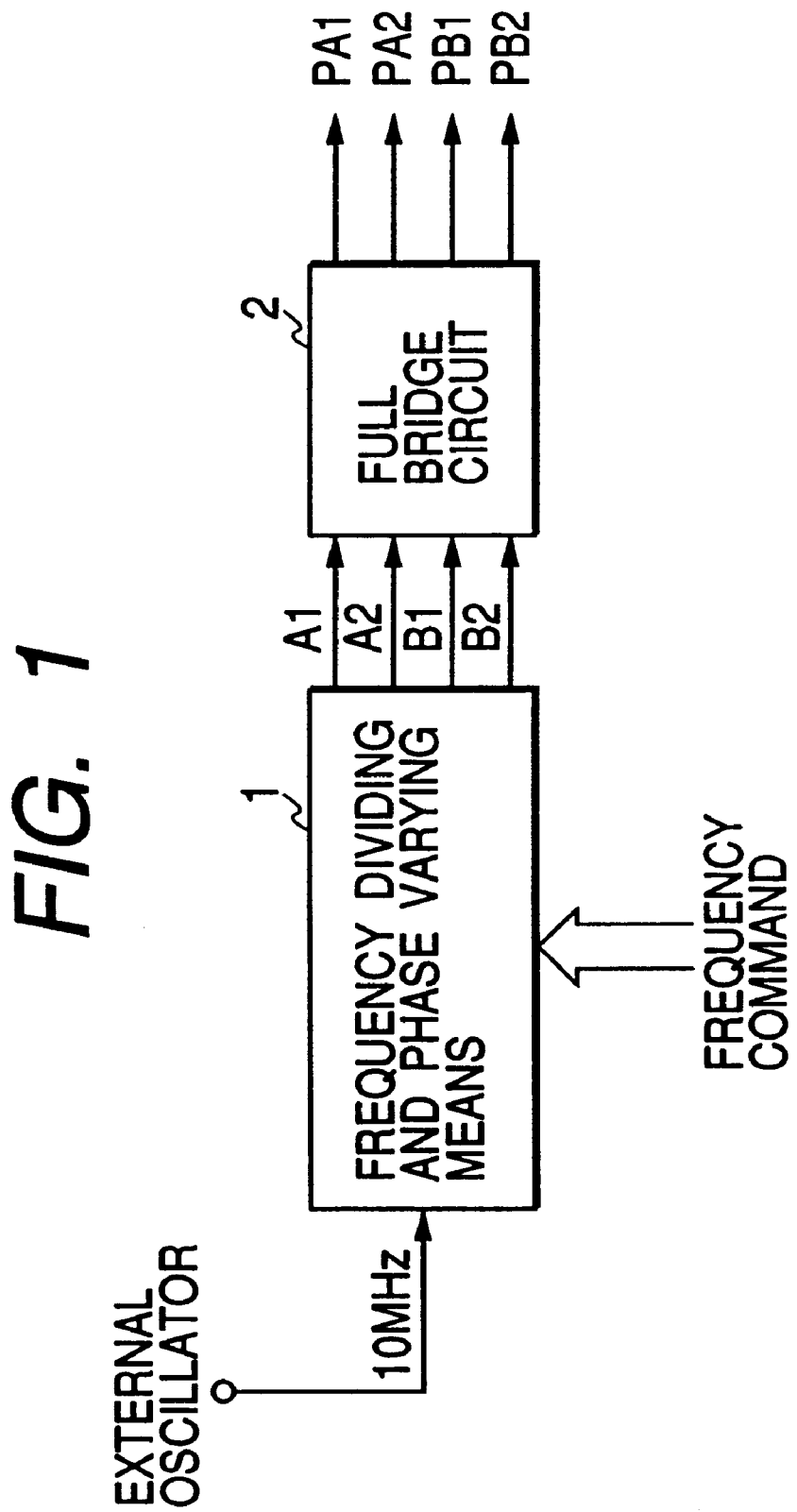
FIG. 1 is a block diagram showing a driving circuit for a vibration type actuator according to an embodiment of the present invention.

FIG. 1 is a block diagram showing an embodiment of the present invention. A frequency dividing and phase varying means 1 receives a reference pulse supplied from an external oscillator (not shown) (an oscillator for generating a 10-MHz pulse by using a quartz oscillator or the like). A full bridge circuit 2 receives and amplifies the output from the frequency dividing and phase varying means 1. A periodic signal is applied to one phase of a vibration wave motor (not shown) in accordance with outputs PA1 and PA2 from the full bridge circuit 2, whereas a 90° out-of-phase periodic signal is applied to the other phase of the motor in accordance with outputs PB1 and PB2, thereby driving the vibration wave motor.

Figure 2:
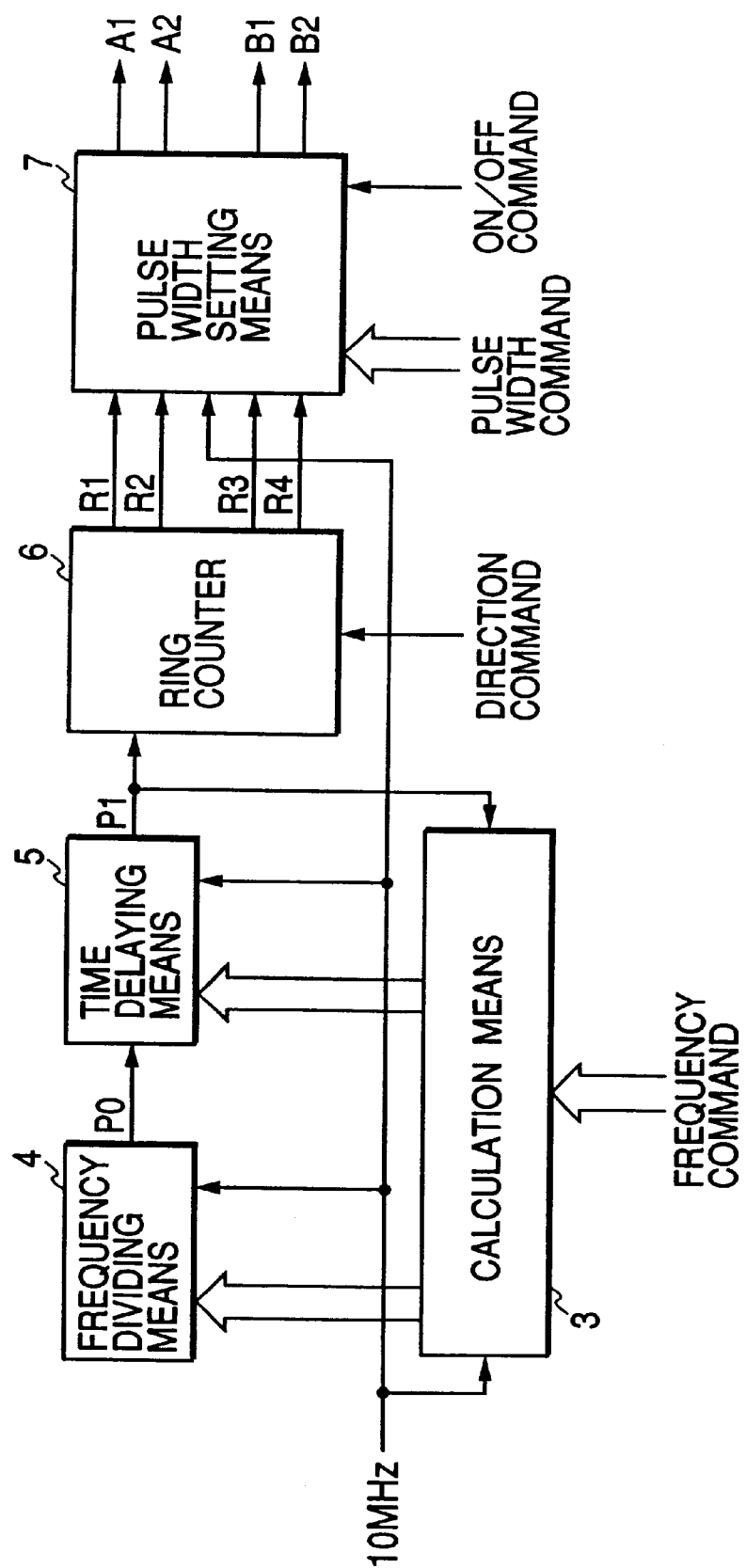
FIG. 2 is a block diagram showing an example of a frequency dividing and phase varying means in FIG. 1.
Figure 3:
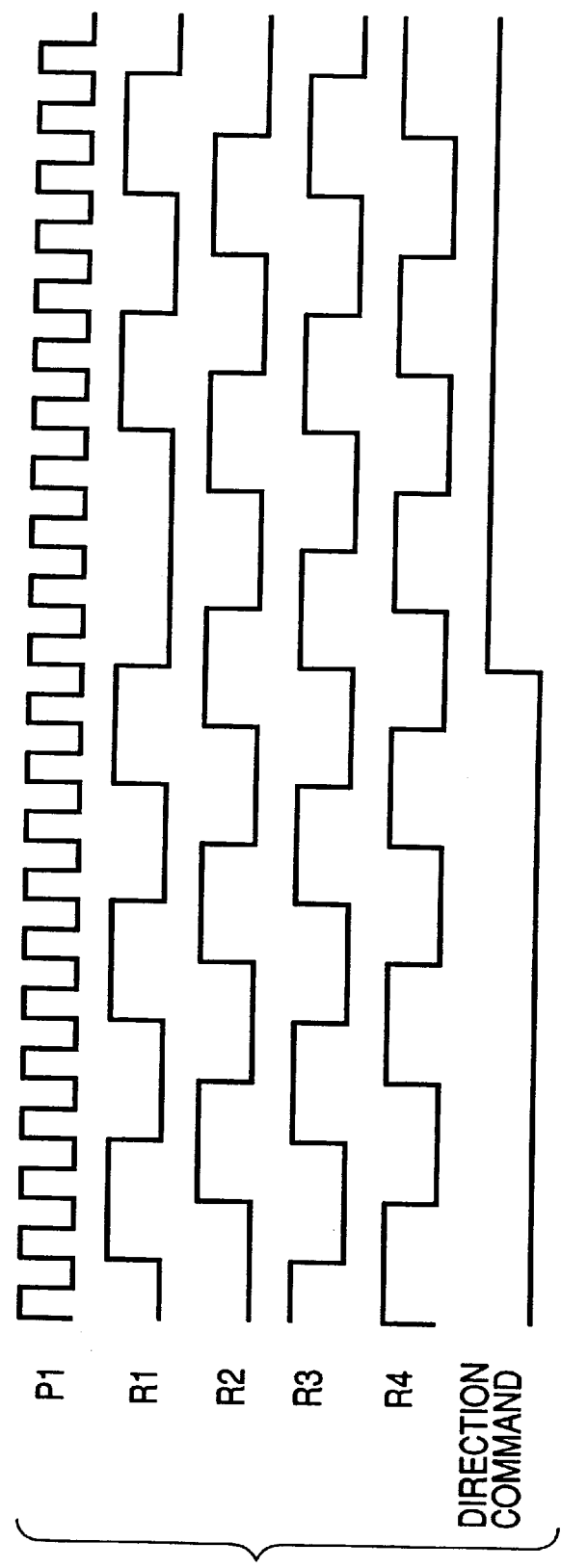
FIG. 3 is a timing chart showing the waveforms of outputs from a ring counter in FIG. 2.

FIG. 2 shows an example of the arrangement of the frequency dividing and phase varying means 1. A calculation means 3 calculates a frequency dividing ratio and delay time in accordance with a frequency command. A frequency dividing means 4 frequency-divides a 10-MHz clock in accordance with the frequency dividing ratio calculated by the calculation means 3, and outputs the resultant clock. A programmable time delaying means 5 outputs a pulse obtained by delaying the leading edge of a pulse signal from the frequency dividing means 4 on the basis of a commanded delay time from the calculation means 3. The calculation means 3 calculates a frequency dividing ratio and delay time every time a pulse is output from the time delaying means 5. A ring counter 6 counts in synchronism with an output pulse from the time delaying means 5. The count direction of the ring counter 6 is decided in accordance with a direction command. FIG. 3 is a timing chart showing the operation of the ring counter 6. The phase relationship between signals R1 and R2, is reversed by a direction command. This reverses the rotational direction of the vibration type actuator. A pulse width setting means 7 sets the pulse widths of four-phase input signals which are output from the ring counter 6 and 90° out of phase with each other. Pulse widths proportional to pulse width commands are set for the input four-phase pulse signals to form pulses A1, A2, B1, and B2. If an ON/OFF command is OFF, all the output signals A1, A2, B1, and B2 are turned off.

The principle of operation of the circuit shown in FIG. 2 will be described. In this embodiment, the programmable delaying means delays the leading edge of a pulse obtained by frequency division by an arbitrary time, thereby producing a desired pulse edge. In this manner, a high-precision oscillating means having a low temperature dependency is implemented. More specifically, if, for example, the required time of one period of a pulse is 2,005 nsec (when a frequency command representing a frequency with a period of 2,005 nsec is input to the calculation means 3), a frequency division count of 20 is set as the frequency dividing ratio of the frequency dividing means 4. With this operation, since a 10-MHz pulse is counted after a frequency division count of 20 is set in the frequency dividing means 4, when 20 100-nsec (period) pulses are counted, the output P0 is output from the frequency dividing means 4. By setting a frequency division count of 20 in the frequency dividing means 4, P0 is output from the frequency dividing means 4 at 2,000-nsec intervals. When P1 is output from the time delaying means 5 with a delay time of 5 nsec being set with respect to P0, the first pulse P1 is output 5 nsec after the first pulse P0 is output from the frequency dividing means 4. Therefore, the first pulse P1 is output 2,005 nsec after the frequency dividing means 4 starts counting the 10-MHz pulse. Since the frequency dividing means 4 continues to count the 10-MHz pulse afterward, the frequency dividing means 4 outputs the second pulse P0 upon counting 20 pulses. This second pulse P0 is output 4,000 nsec after the frequency dividing means 4 starts counting the pulse. If the same delay time, i.e., 5 nsec, is kept set in the time delaying means 5 with respect to the second pulse P0, the second pulse P1 is output 4,005 nsec after the frequency dividing means 4 starts counting the pulse. In this case, the pulse P1 having a period of 2,000 nsec cannot be formed. In this embodiment, therefore, the delay time in the time delaying means 5 is increased by 5 nsec to 10 nsec with respect to the second pulse P0. The second pulse P1 is therefore formed after 40 100-nsec (period) pulses are counted and a delay time of 10 nsec elapses, i.e., 4,010 nsec, after the frequency dividing means starts counting pulses, and the time difference between the edges of the pulses P1 is always controlled to 2,005 nsec. In this manner, since the delay time is accumulated by 5 nsec every time the pulse P0 is output from the frequency dividing means 4, a frequency can be set with a resolution higher than that of the 10-MHz clock. When the cumulative value exceeds the period, 100 nsec, of a pulse input to the frequency dividing means 4, 100 nsec is subtracted from the cumulative value, and the frequency division count is increased by one, thereby continuously generating pulse signals.

Figure 4:
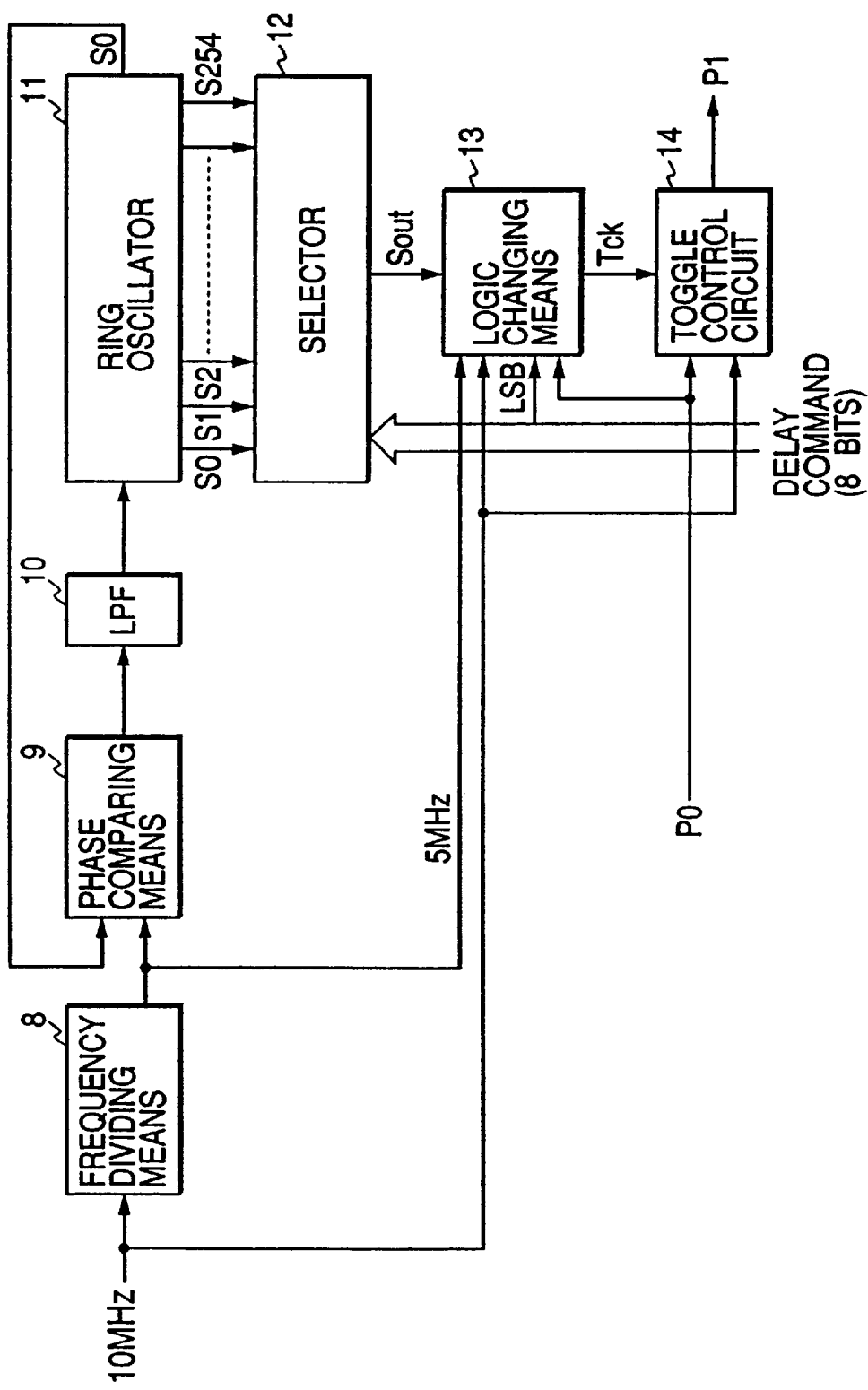
FIG. 4 is a block diagram showing an example of a time delaying means in FIG. 2.
Figure 5:
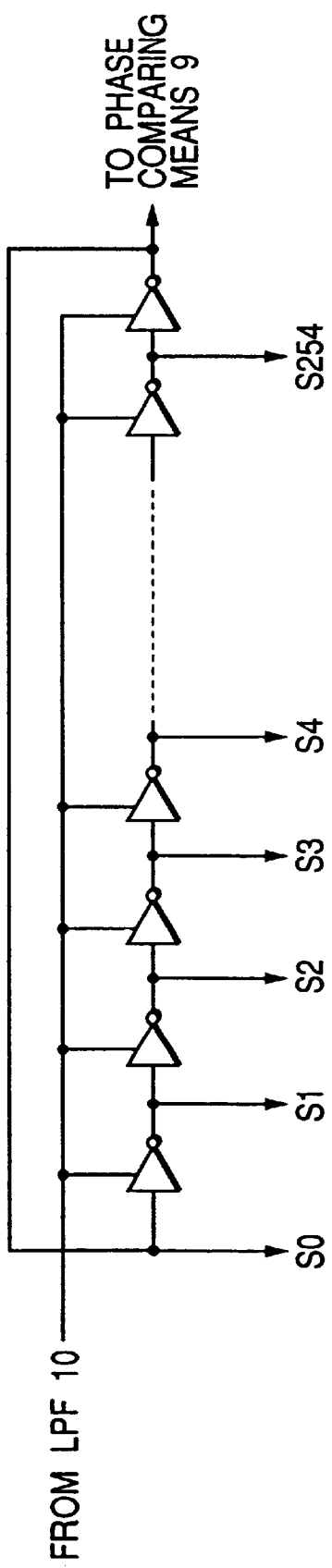
FIG. 5 is a circuit diagram showing the arrangement of a ring oscillator in FIG. 4.
Figure 6:
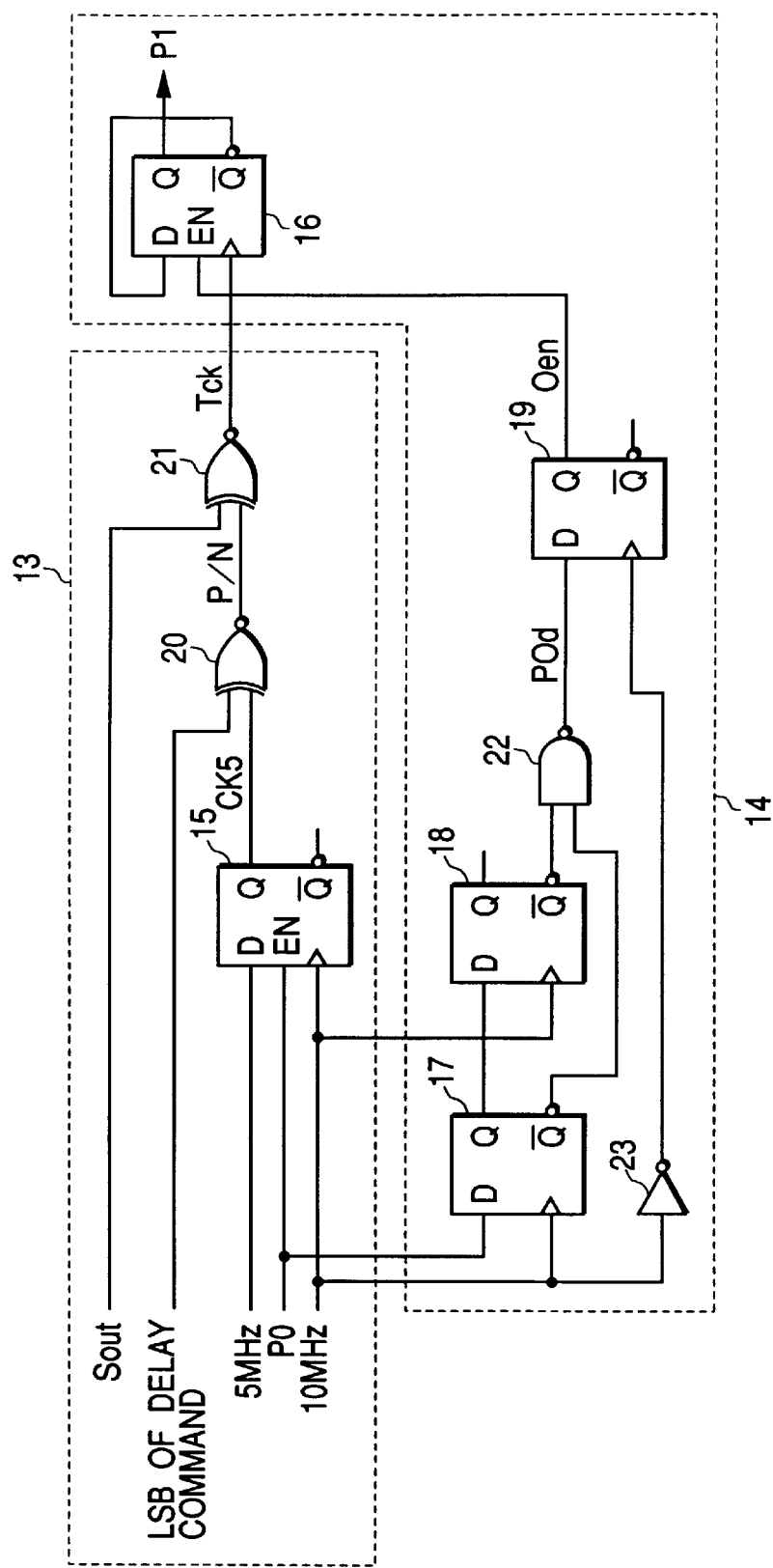
FIG. 6 is a circuit diagram showing an example of the circuit arrangement of a logic changing means and toggle control circuit in FIG. 4.
Figure 7:
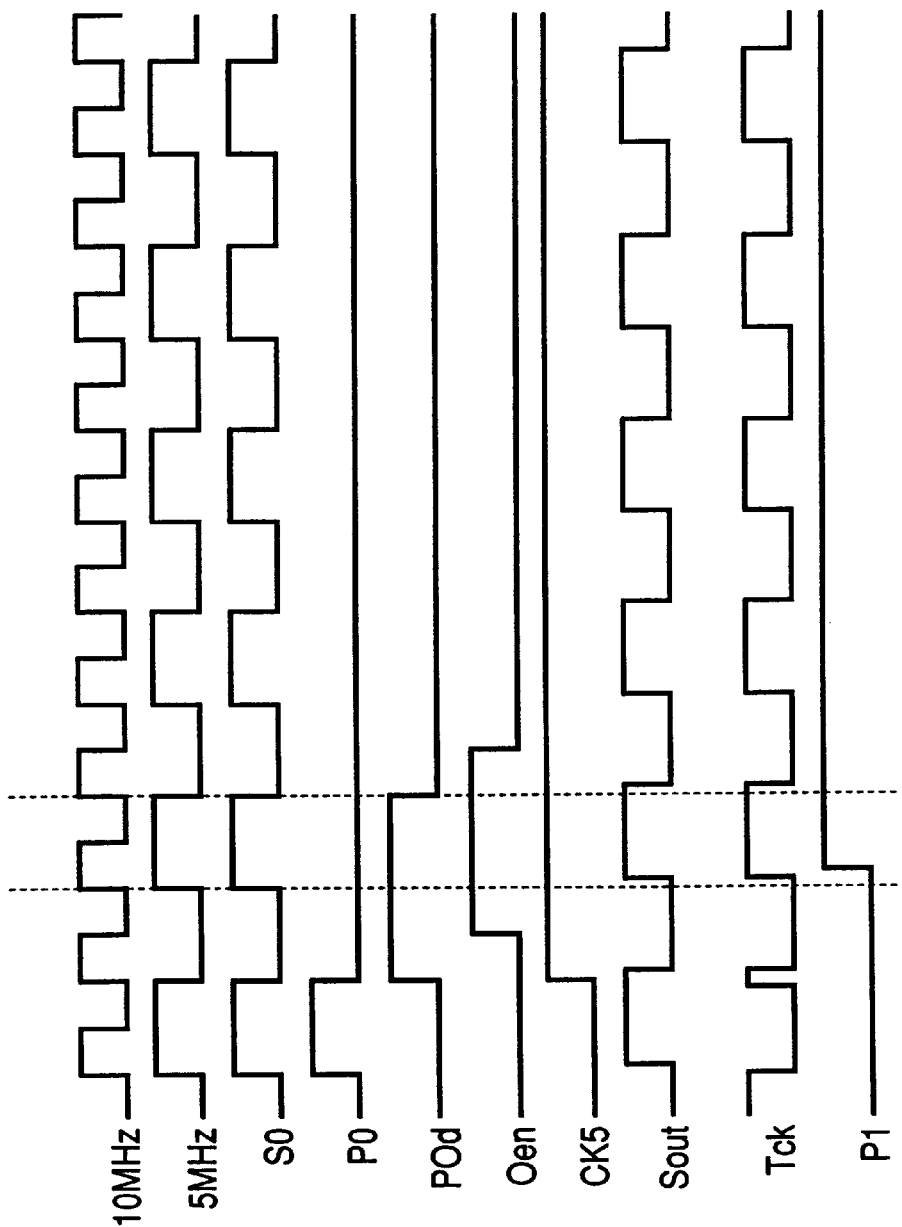
FIG. 7 is a timing chart showing waveforms to explain the operation of the arrangement in FIG. 4.
Figure 8:
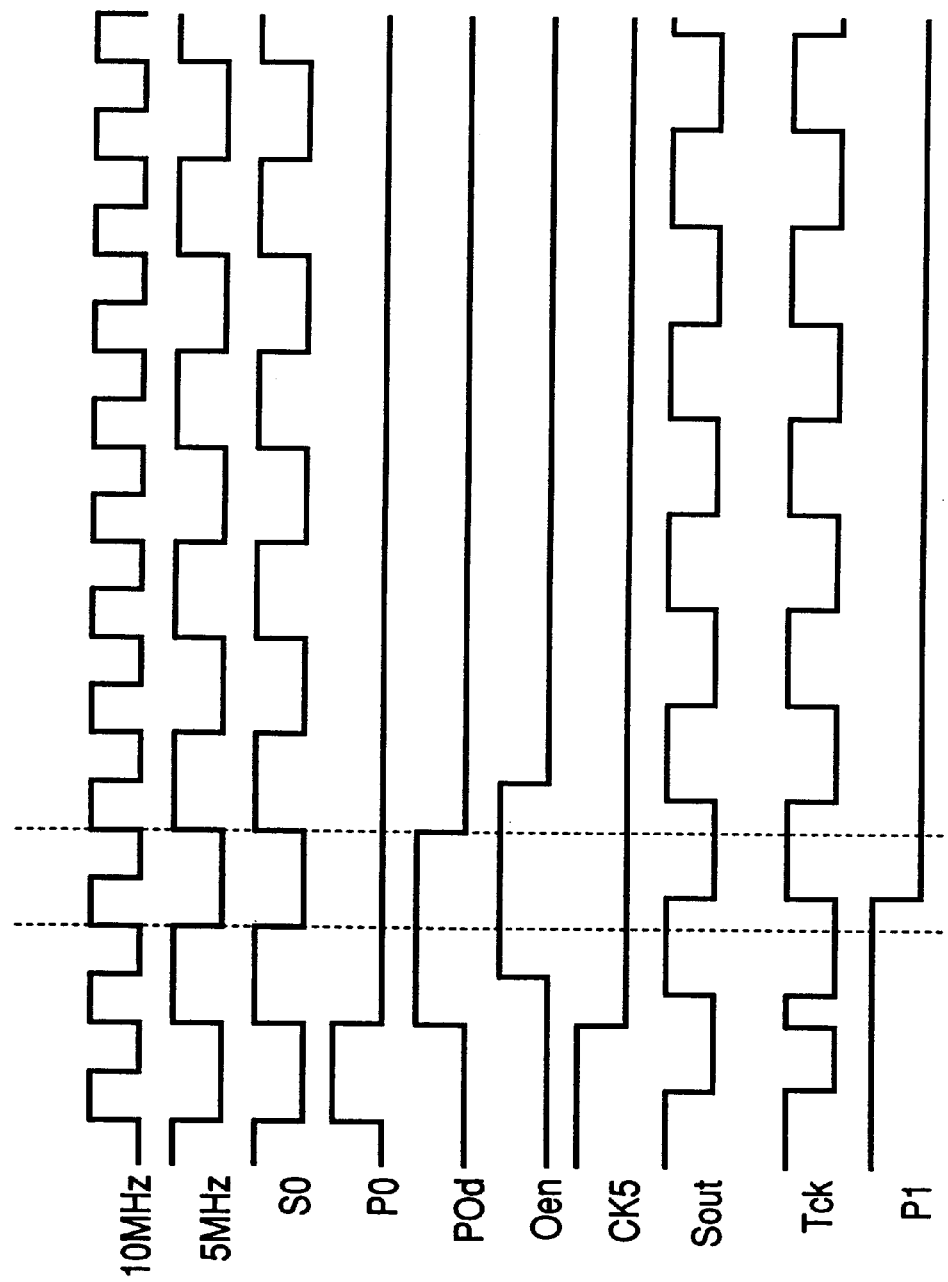
FIG. 8 is a timing chart showing waveforms to explain the operation of the arrangement in FIG. 4.

FIG. 4 shows a circuit arrangement of the delaying means. A frequency dividing means 8 receives a 10-MHz clock and outputs a 5-MHz pulse signal. A phase comparing means 9 compares the phase of the 5-MHz pulse signal with that of a signal S0. A low-pass filter 10 receives the output from the phase comparing means 9 and removes noise therefrom. A ring oscillator 11 has 255 inverting elements connected in the form of a ring. The oscillation frequency of the ring oscillator 11 is determined by the output signal from the low-pass filter 10. As shown in FIG. 5, the 255 inverting means of the ring oscillator 11 are connected in the form of a ring. The delay times of the respective inverting means are controlled by changing power. The reciprocal of the time being equal to 510 times of this unit delay time is equal to the oscillation frequency. In this case, the ring oscillator 11 is one of known VCOs (Voltage-Controlled Oscillators). The ring oscillator 11, the phase comparing means 9, and the low-pass filter 10 constitute a PLL oscillation circuit. The frequency of the ring oscillator 11 is controlled to reduce the phase difference between the 5-MHz pulse signal output from the frequency dividing means 8 and the signal S0 to 0°. All signals S0 to S254 are 5-MHz pulse signals. Their pulse edges shift from each other by the delay time of one inverting element. The delay time is therefore controlled by the PLL to be set to 1/255 of 100 nsec. Note that each pair of signals of consecutive numbers are logically inverted by the inverting elements, and hence the phase shift between the leading edge of the signal S1 and the trailing edge of the signal S2 corresponds to the unit delay amount. Although the ring oscillator 11 outputs 255 signals, any number of signals may be output as long as it is an odd number equal to or larger than three. This number is preferably set to $2^N-1$ in terms of efficiency. A selector 12 outputs one of the signals S0 to S254 which is selected in accordance with a delay command to Sout. A logic changing means 13 chooses between inverting a signal Sout or not inverting it in accordance with the least significant bit of the delay command and the 5-MHz signal. As described above, adjacent outputs from the ring oscillator 11 are inverted, and hence the outputs are alternately inverted. To cope with this, the above operation is performed on the basis of the least significant bit of a delay command. A toggle control circuit 14 inverts the output P1 every time Tck is input. Whether to invert the output P1 is controlled by an enable signal formed from the P0 signal. FIG. 6 shows an example of the circuit arrangement of the logic changing means 13 and toggle control circuit 14. FIGS. 7 and 8 are timing charts showing the operation of this arrangement. Referring to FIG. 6, each of D-flip-flops 15 and 16 with enable inputs is designed such that when an input EN is at high level, the signal level at an input D is set in the internal register at the leading edge of a clock input, and the value of the register is output to an output Q. The arrangement includes known D-flop-flops 17, 18, and 19, an exclusive OR element (XOR) 20, an exclusive NOR element (XNOR) 21, an AND element 22, and a NOT element 23. The signal P0 is a 100-nsec pulse signal from the frequency dividing means 4. This circuit aims at selecting and outputting one of a plurality of pulses from the ring oscillator 11 which is delayed from this 100-nsec pulse signal by a predetermined period time. The signal Sout output from the selector 12 may be logically inverted or include an unnecessary signal component. This circuit is therefore designed to output only a necessary portion with proper logic. The operation of each portion will be described with reference to FIGS. 7 and 8. The output P1 is designed to be inverted within 200 to 300 nsec after the leading edge of the pulse P0. The portion enclosed with the dotted lines corresponds to this interval. Since different operations are performed depending on whether the 5-MHz pulse is at low level or high level when the pulse P0 having a width of 100 nsec is output, the operations in FIGS. 7 and 8 will be separately described. Assume that the least significant bit of the delay command is fixed to low level. FIG. 7 shows the case wherein the 5-MHz signal is at high level. A signal CK5 is set at low level at the trailing edge of the pulse P0. As a consequence, the signal Sout is output as the signal Tck without any change. A signal Oen is turned on 150 nsec after the leading edge of the pulse P0, and a pulse having a pulse width of 200 nsec is output. While the signal Oen is at high level, the signal P1 is inverted at the leading edge of the signal Tck. FIG. 8 shows the operation to be performed when the 5-MHz signal is at low level while the pulse P0 is at high level. The signal CK5 is set at high level at the trailing edge of the pulse P0. As a consequence, the signal Tck becomes an inverted signal of the signal Sout. Subsequently, the signal P1 is inverted in the same manner as described with reference to FIG. 7. The PLL circuit in which such a frequency is fixed operates stably, and each delay time is stable. Therefore, a frequency can be digitally set, and any special adjustment is not required, thus providing a highly reliable driving circuit. In brief, the time delaying means in FIG. 4 forms the pulse P1 by selecting one of the pulses S0 to S254, which shift from each other by the unit delay time set by the ring oscillator in accordance with the delay time (delay command) from the calculation means 3. A driving signal is applied to a piezoelectric element as an electro-mechanical energy conversion element corresponding to each phase of the vibration wave motor through the ring counter 6, the pulse width setting means 7, and the full bridge circuit 2 in accordance with a frequency signal corresponding to the frequency of the pulse P1 formed in this manner.

Figure 9:
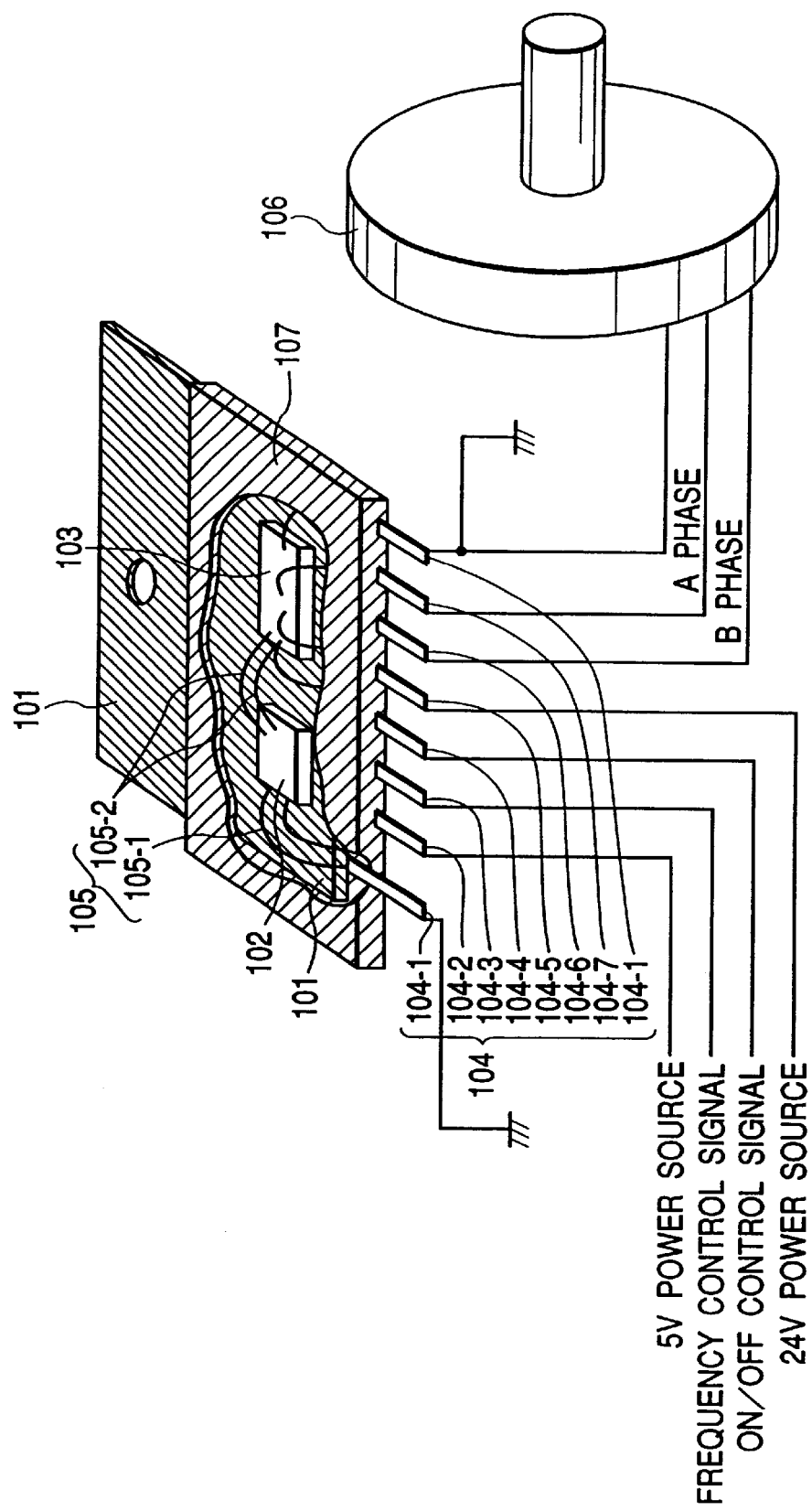
FIG. 9 is a view showing an example of how a driving circuit of the present invention is mounted.

FIG. 9 shows an example of how the driving circuit shown in FIG. 1 is mounted. Referring to FIG. 9, a metal plate 101 such as a copper plate serves as a heat radiating means. This heat radiating plate may be a ceramic plate. A pulse generating means 102 generates two-phase pulse signals having a desired frequency and different phases. A half bridge circuit 103 amplifies the power of the pulse signals. The pulse generating means 102 and the half bridge circuit 103 are silicon chips as discrete ICs. Electrodes 104 are used to transfer an external command and extract an output from the half bridge circuit 103. Bonding wires 105 are made of gold, aluminum, or the like and formed to electrically connect the pulse generating means 102, the half bridge circuit 103, and the electrodes 104 to each other. This arrangement also includes a vibration type actuator 106. A resin member 107 is formed to cover the electrodes 104, the metal plate 101, and all the circuits on the metal plate 101.

Figure 12:
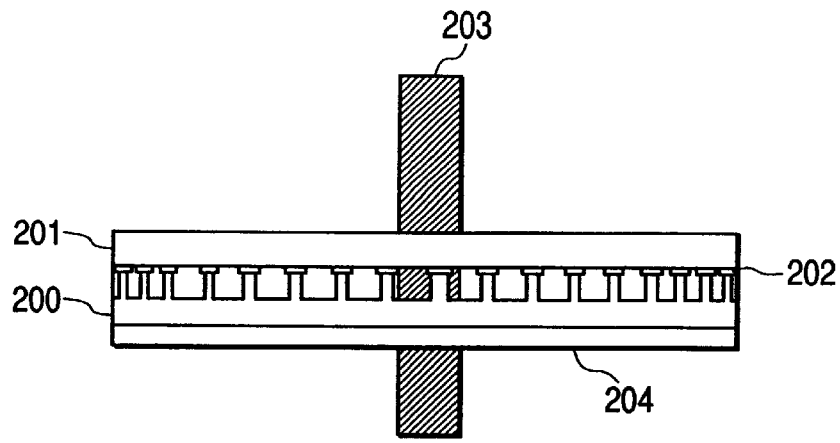
FIG. 12 is a view showing the arrangement of a vibration type actuator.
Figure 13:
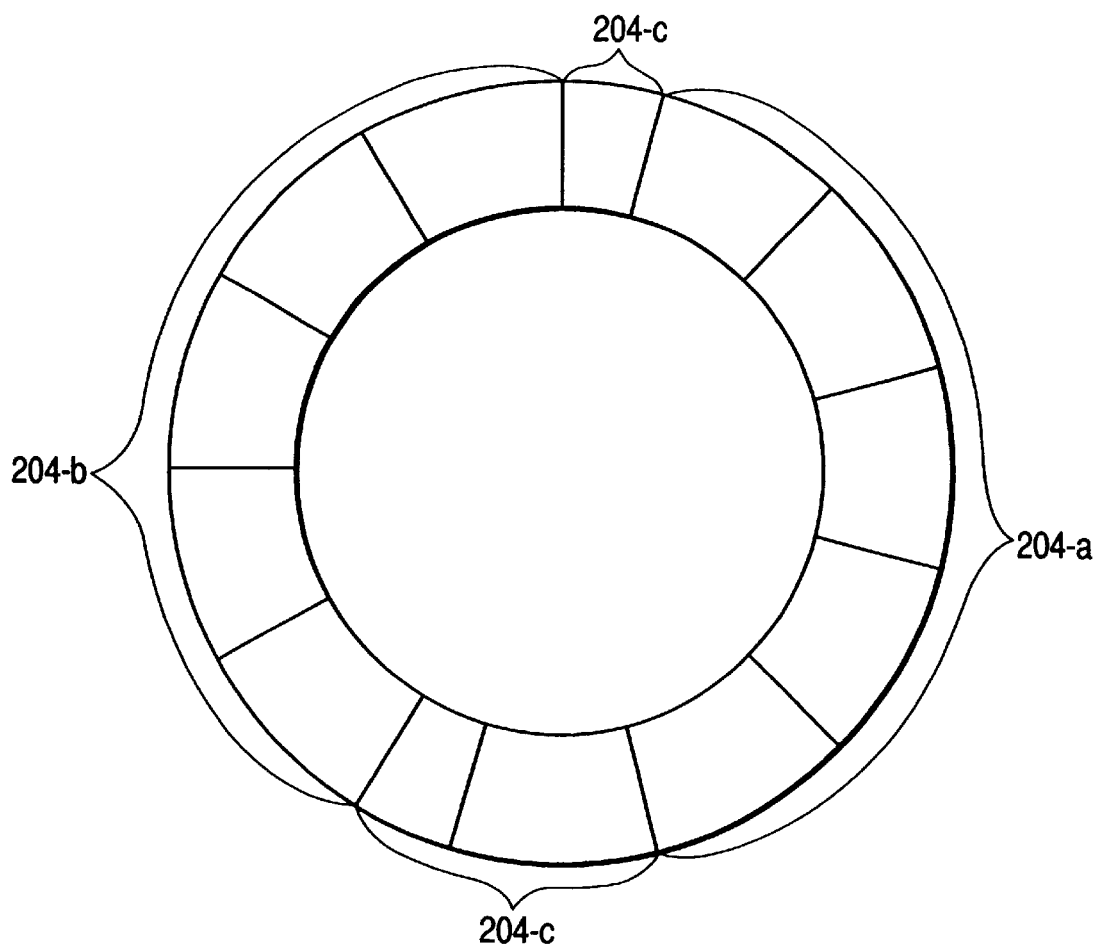
FIG. 13 is a view showing the electrode structure of the piezoelectric element of the vibration type actuator in FIG. 12.
Figure 14:
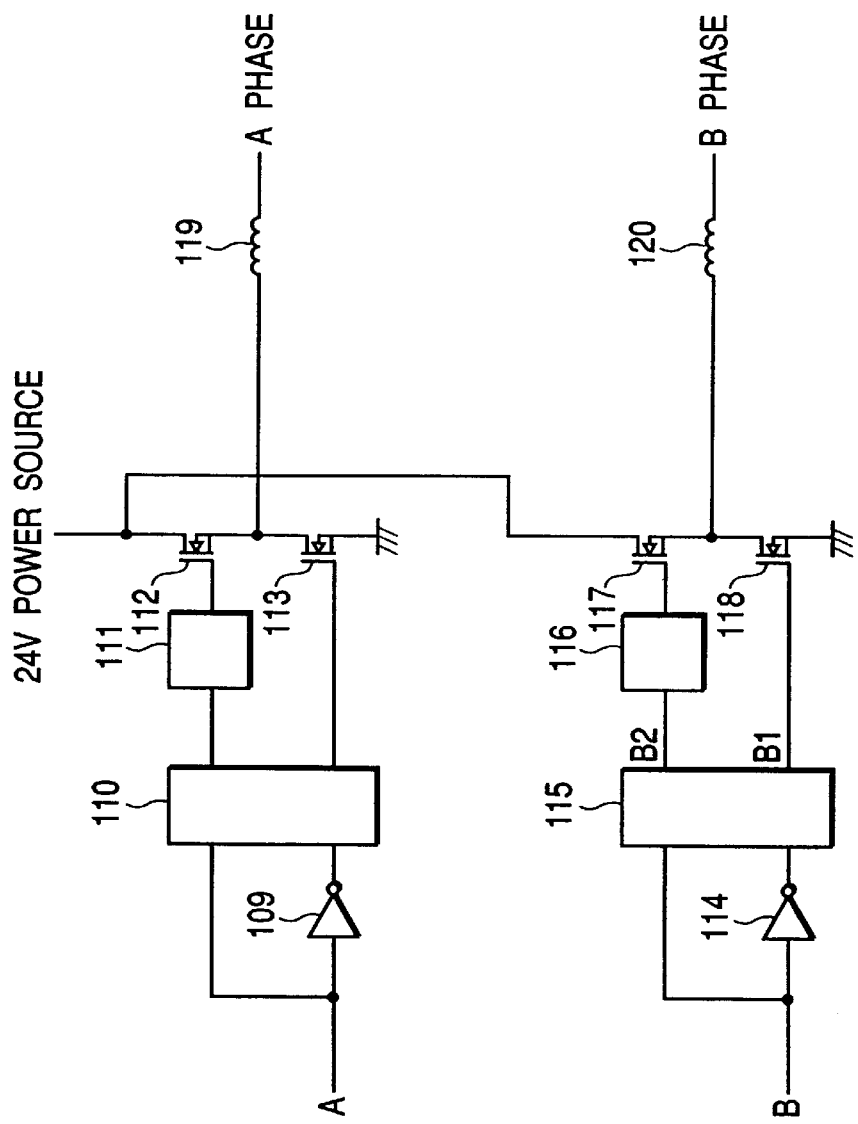
FIG. 14 is a block diagram showing another example of the half bridge circuit as an amplification means in FIG. 10.
Figure 15:
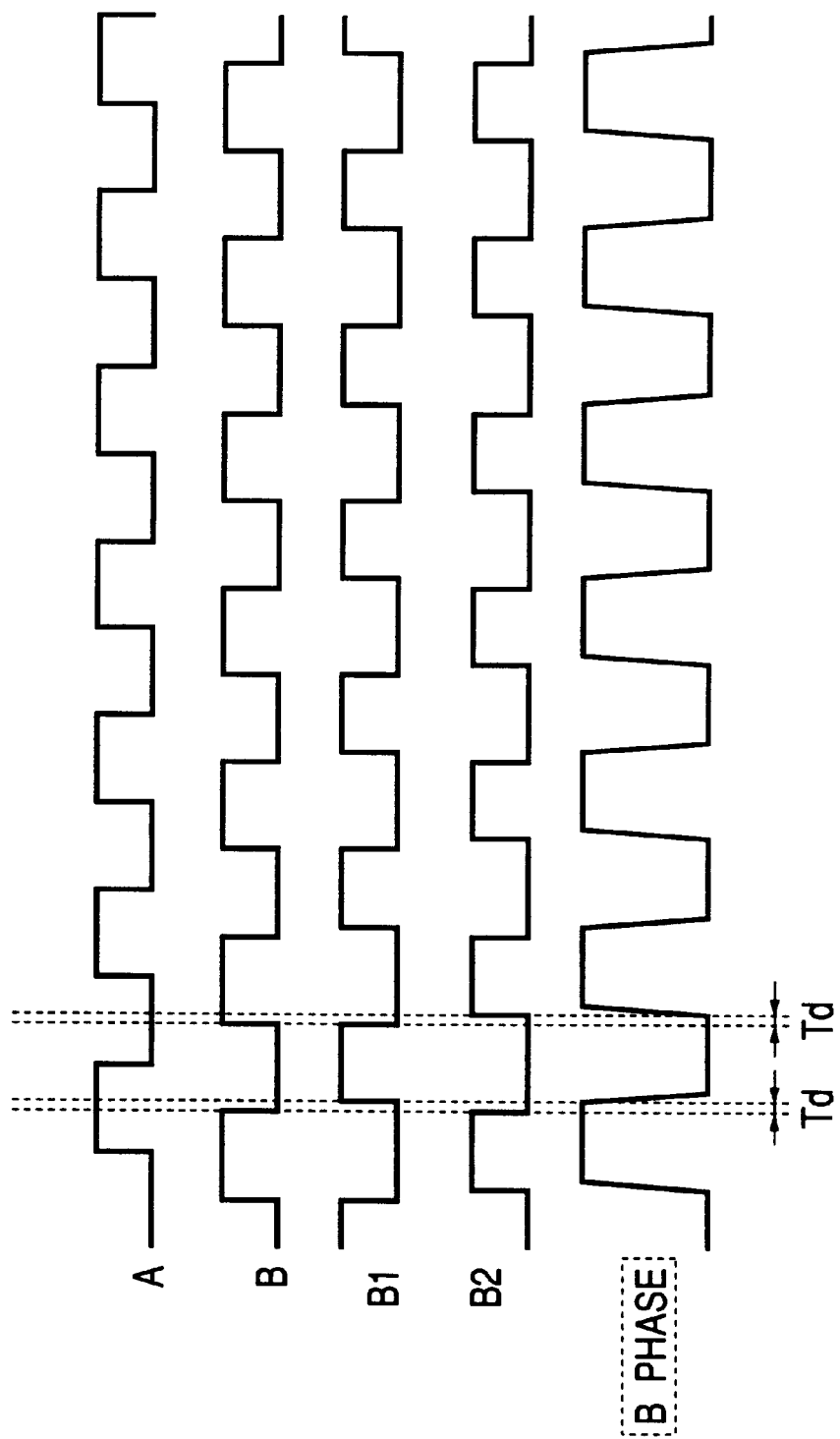
FIG. 15 is a timing chart showing the operation of the half bridge circuit.
Figure 16:
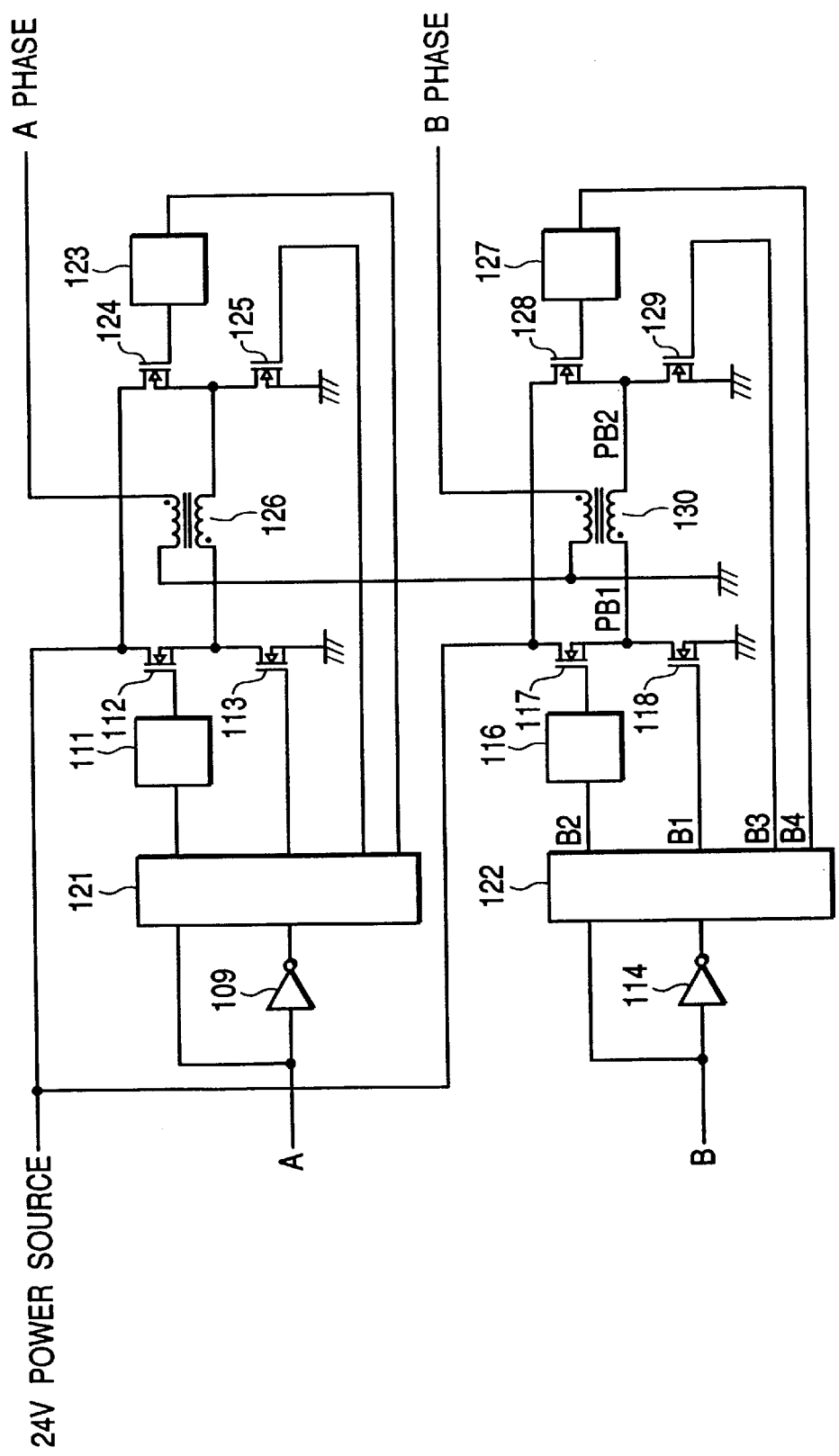
FIG. 16 is a block diagram showing a full bridge circuit as an amplification means in FIG. 10.
Figure 17:
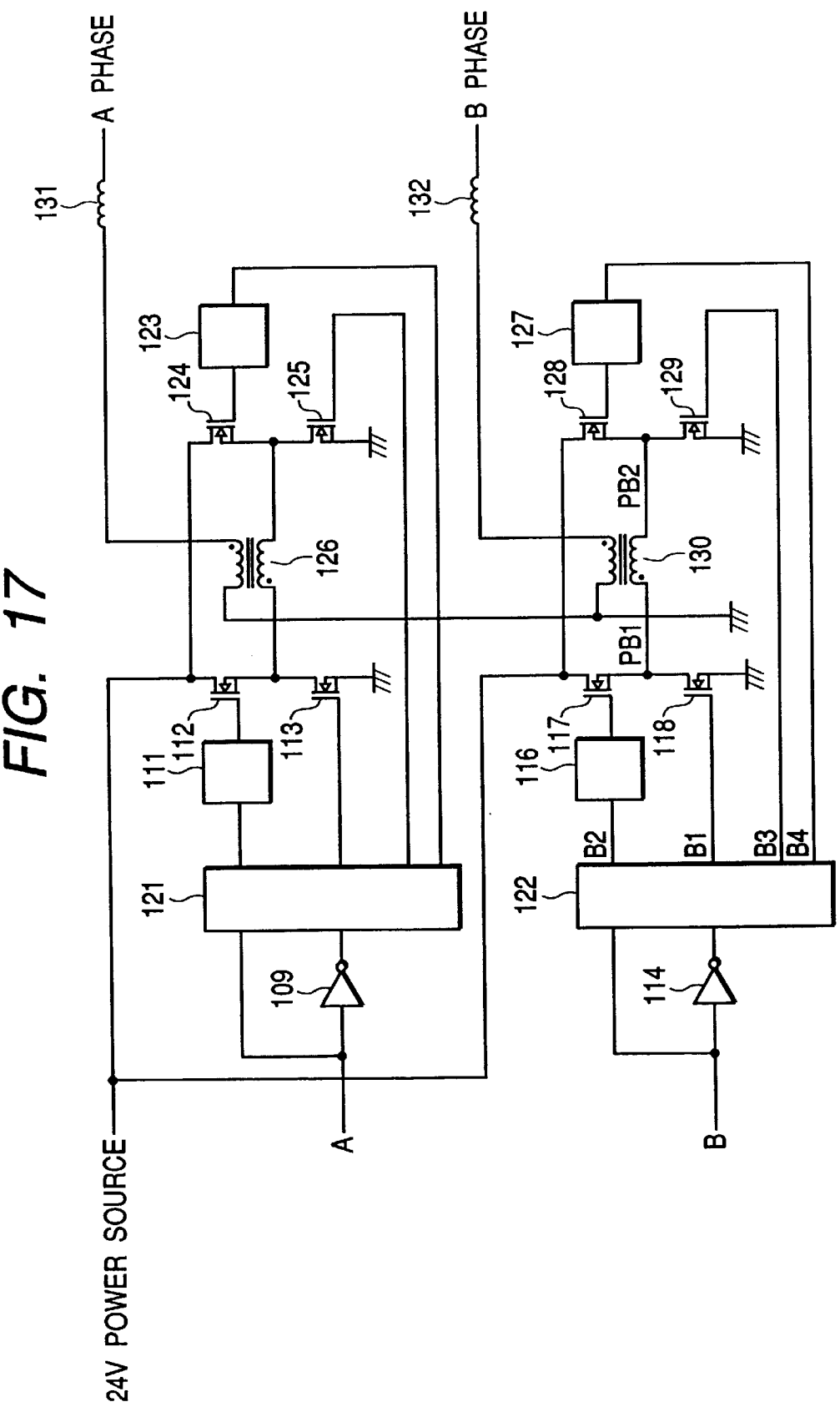
FIG. 17 is a block diagram showing another example of the full bridge circuit.
Figure 18:
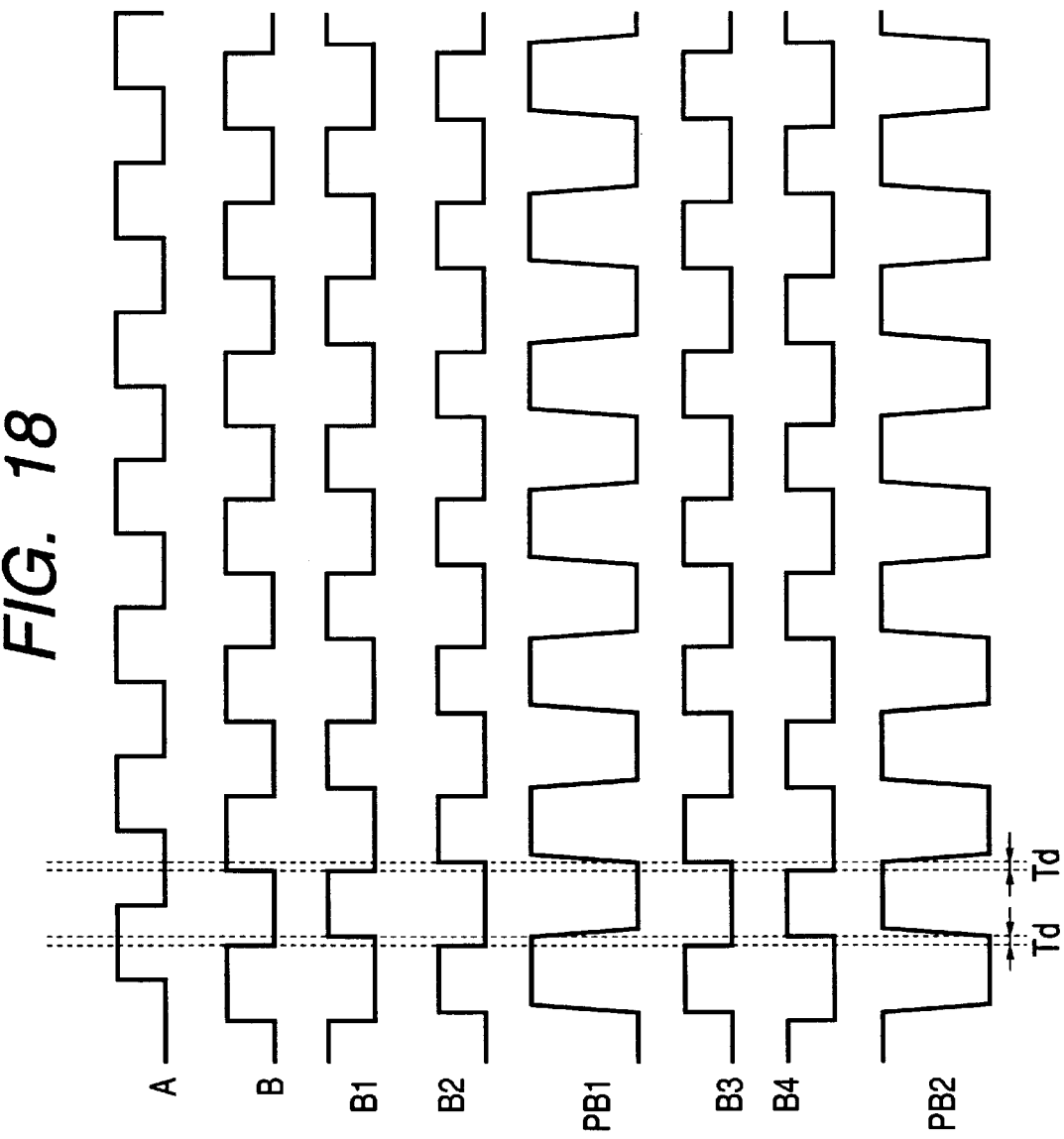
FIG. 18 is a timing chart showing the operation of the full bridge circuit.

All the circuits on the metal plate 101, except for portions of the electrodes 104 and metal plate 101, are covered with the resin member 107. Ground electrodes 104-1 are connected to the ground terminals of two power sources (not shown) to be described later so as to ground the metal plate 101. The pulse generating means 102 operates by a 5V power source and receives the 5V power source voltage from an electrode 104-2. A signal for setting the frequency of the two-phase pulses output from the pulse generating means 102 is supplied to an electrode 104-3. A signal for ON/OFF-controlling the output of the pulse generating means 102 is supplied to an electrode 104-4. The two-phase pulse signals from the pulse generating means 102 are supplied to the half bridge circuit 103 as an amplification circuit through bonding wires 105-2. The powers of these pulse signals are amplified, and the resultant signals are output from electrodes 104-6 and 104-7. An electrode 104-5 receives a 24V power source voltage. The half bridge circuit 103 converts the pulse signals having an amplitude of 5 V and supplied through the bonding wires 105-2 into pulse signals having an amplitude of 24 V, and outputs them from the electrodes 104-6 and 104-7. The AC voltages output from the electrodes 104-6 and 104-7 are respectively applied to the A and B phases of the vibration type actuator 106. FIG. 10 is a circuit diagram showing a circuit arrangement of the pulse generating means. A known voltage-controlled oscillator (VCO) 108 generates a reference pulse signal. A frequency dividing and phase varying means 162 receives the pulse signal output from the VCO 108 and frequency-divides it at a set frequency dividing ratio, thereby generating two-phase pulse signals having different phases and a frequency at which the vibration type actuator is driven. The VCO 108 is controlled by the frequency control signal input from the electrode 104-3 to output a desired frequency. The output from the VCO 108 is input to the frequency dividing and phase varying means 162 to be frequency-divided at a predetermined frequency dividing ratio. As a result, two pulse signals which are 90° out of phase with each other are output. FIG. 11 is a circuit diagram showing an example of the half bridge circuit 103. N-channel MOSFETs 112, 113, 117, and 118 have a DMOS structure and constitute half bridge circuits for two phases. The ON resistance of each MOSFET is preferably set to 1.2Ω or less in consideration of limitations concerning power. In consideration of limitations concerning chip area and the need for increasing output power, the ON resistance is preferably set to about 0.2 to 0.3Ω. The breakdown voltage of each MOSFET can be selectively set to, for example, 40 V, 60 V, or 80 V. In the case of the 24V power source, the breakdown voltage may be set to 40 V. The 24V power source (not shown) is connected to the power source input through the external electrode 104. High-side drivers 111 and 116 serve to drive the MOSFETs 112 and 117 and are respectively connected to the gates of the MOSFETs 112 and 117. This arrangement also includes inverters 109 and 114. Time delaying means 110 and 115 delay pulses to prevent the MOSFET 112 or 117 and the MOSFET 113 or 118 from being simultaneously turned on. FIG. 12 shows the arrangement of an annular actuator which is one of vibration type actuators. Referring to FIG. 12, a vibrator 200 is made up of one or more elastic members. A rotor 201 is in press contact with the vibrator 200 trough a pressure means (not shown). A friction member 202 is bonded to the vibrator 200 and clamped between the vibrator 200 and the rotor 201. A rotating shaft 203 is connected to the center of the rotor 201. A piezoelectric element 204 serving as an electro-mechanical energy conversion element is bonded to the vibrator 200. The surface of the piezoelectric element 204 is divided into a plurality of electrodes in the form shown in FIG. 13. These electrodes are constituted by two driving electrode groups 204-a and 204-b and one sensor electrode portion 204-c. These portions 204-a, 204-b, and 204-c are respectively referred to as A, B, and S phases. According to the vibration type actuator shown in FIG. 12, AC voltages having a temporal phase difference of 90° are applied to the A and B phases to generate traveling vibration waves in the vibrator 200. This vibration force is transferred to the rotor 201, which is in press contact with the vibrator 200 through the friction member 202, through frictional force, thereby rotating the rotor 201. As described above, when the two-phase AC voltages output from the half bridge circuit 103 are applied to the vibration type actuator, the rotor 201 and the vibrator 200 rotate relatively. FIG. 14 shows a circuit arrangement designed to increase the amplitude of the voltage to be applied to the vibration type actuator 106. Referring to FIG. 14, step-up inductors 119 and 120 are inserted between the vibration type actuator 106 and the half bridge circuit 103, so that the output voltage from the half bridge circuit 103 is amplified owing to the equivalent capacitance of the piezoelectric element 204 and a resonance phenomenon of the inductors 119 and 120. The amplified voltage is then applied to the piezoelectric element 204. The values of the inductors 119 and 120 are made to match with the equivalent capacitance, but the matching frequency is set in a range higher than the resonance frequency of the vibrator 200. More specifically, the matching frequency is set in a range higher than the resonance frequency within the operation temperature range in consideration of at least changes in equivalent capacitance and resonance frequency in the operation temperature range. In addition, by making matching in a range higher than the antiresonance frequency of the operation mode, the influences of variations in matching characteristics due to temperature changes are reduced, thereby always stably providing a voltage amplitude to be applied to the piezoelectric element 204. FIG. 15 is a timing chart showing the waveforms of signals in the half bridge circuit 103. The time delaying means 115 delays each pulse by a delay time Td. The delay time Td is set to prevent the N-channel MOSFETs 117 and 118 from being simultaneously turned on. In general, the delay time Td is set to about 20 nsec to 100 nsec. FIG. 16 shows an example of a circuit designed to apply higher voltages to the piezoelectric element 204. The half bridge circuit serving as an amplification circuit is replaced with a full bridge circuit, and peripheral circuits are added and changed. Referring to FIG. 16, N-channel MOSFETs 112, 113, 117, 118, 124, 125, 128, and 129 have a DMOS structure and constitute full bridge circuits for two phases. A 24V power source (not shown) is connected to the power source input through an external electrode 104. High-side drivers 111, 116, 123, and 127 serve to drive the MOSFETs 112, 117, 124, and 128 and are connected to the gates of the MOSFETs 112, 117, 124, and 128. This arrangement also includes inverters 109 and 114. Time delaying means 121 and 122 delay pulses to prevent the MOSFETs 112, 117, 124, and 128 and the MOSFETs 113, 118, 125, and 129 from being simultaneously turned on. By using the full bridge circuit in place of the half bridge circuit 103 and using transformers 126 and 130 in place of the inductors 119 and 120 in this manner, the amplitudes of AC voltages to be applied to the piezoelectric element 204 can be arbitrarily set by changing the turn ratio of the transformers 126 and 130. In this case, the waveform of a pulse output from the full bridge circuit can be blunted by adjusting the characteristics of the transformers 126 and 130 and decreasing the coupling coefficient to about 0.6 to 0.9. This can reduce the harmonic components of the waveforms of voltages to be applied to the piezoelectric element 204. To decrease the coupling coefficient is equivalent to insert proper inductor elements between the outputs of the transformers 126 and 130 and the piezoelectric element 204. FIG. 17 shows a case wherein inductors 131 and 132 are connected to the outputs of the transformers 126 and 130. This equivalently decreases the coupling coefficient of the transformers 126 and 130. FIG. 18 is a timing chart showing the waveforms of signals in the above full bridge circuit. As in the waveforms of signal in the half bridge circuit 103, the delay time Td is set in each of signals B1, B2, B3, and B4 to prevent the MOSFETs on the high side and low side from being simultaneously turned on.

Figure 19:
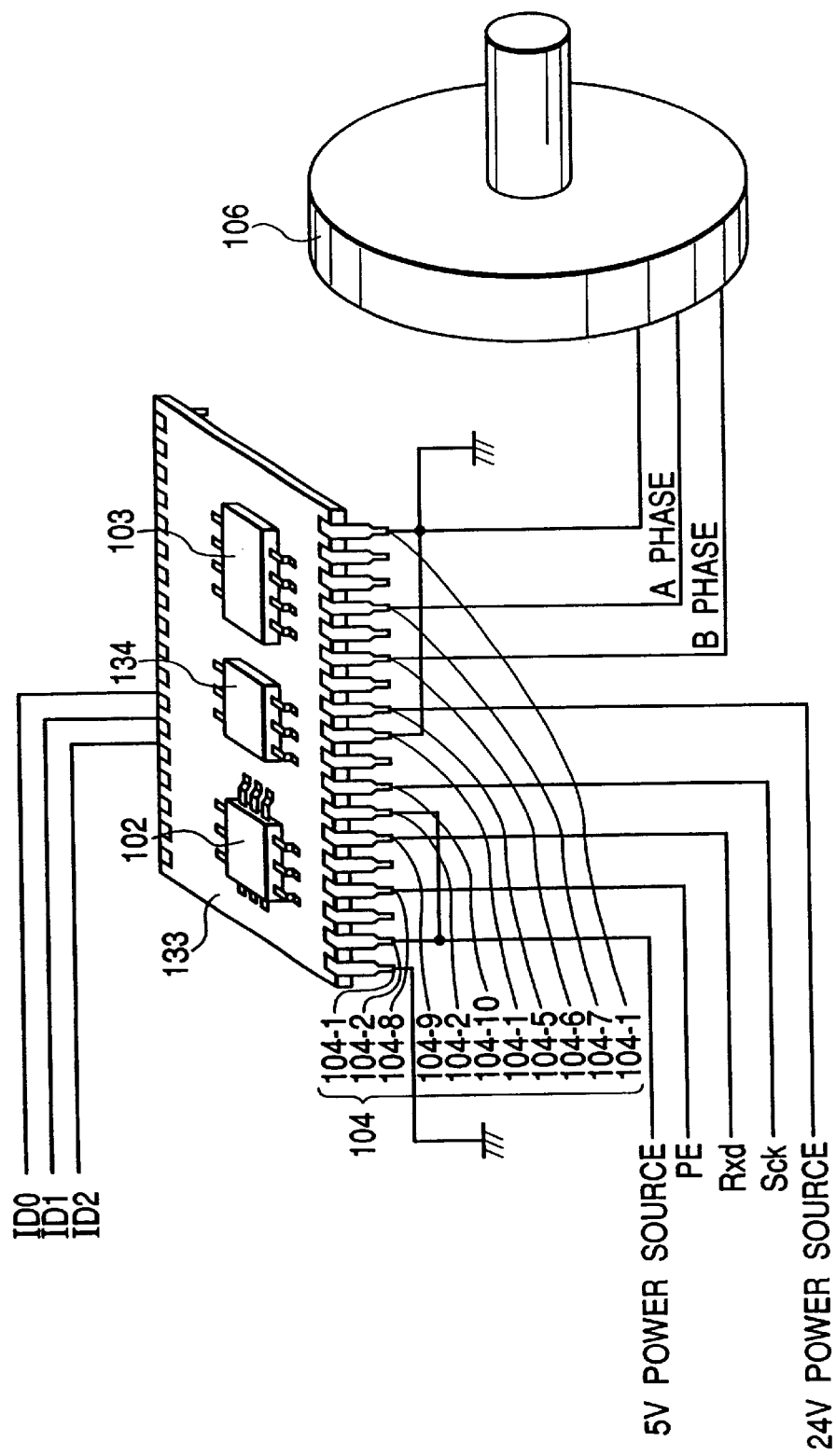
FIG. 19 is a block diagram showing another example of how a driving circuit of the present invention is mounted.
Figure 22:
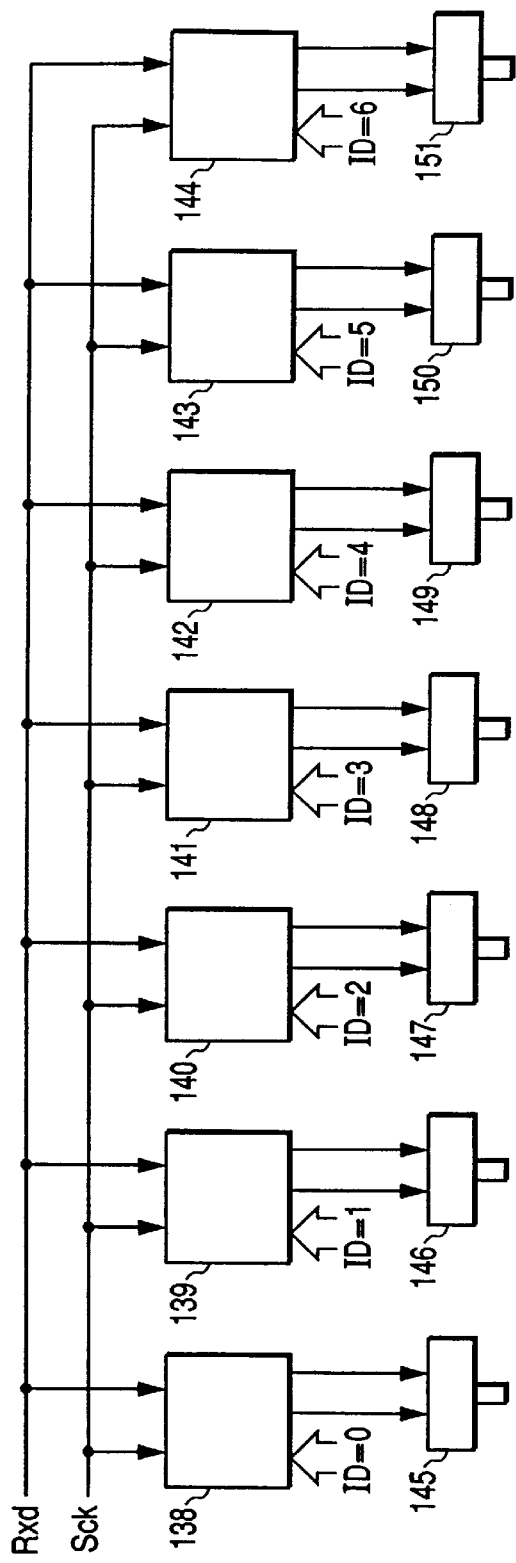
FIG. 22 is a block diagram showing how a plurality of driving circuits for vibration type actuators are connected to each other.
Figure 23:
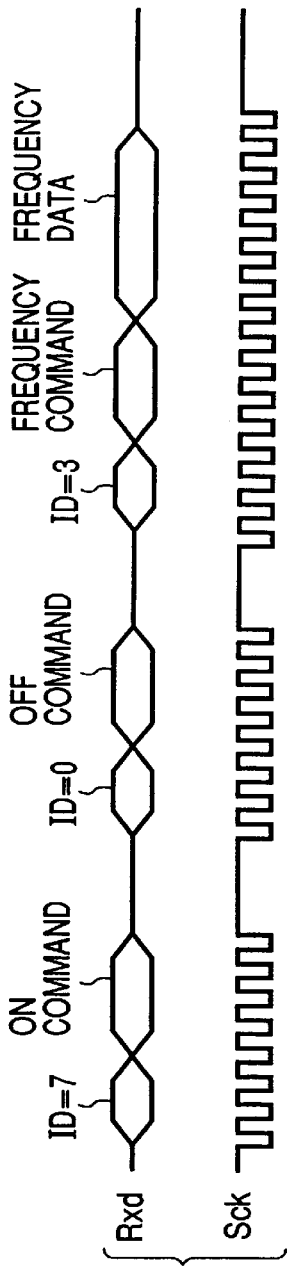
FIG. 23 is a timing chart showing the timing of communication with the driving circuits for the vibration type actuators in FIG. 22.

FIG. 19 shows still another example of how a driving circuit is mounted. Referring to FIG. 19, this arrangement includes silicon chips 102 and 103 which have been described with reference to FIG. 9. A ceramic plate 133 serves as a heat radiation means. The heat radiation means may be a metal plate. A control means 134 receives a command from an external command means (not shown), analyzes it, and outputs a frequency command and ON/OFF command for a pulse signal to the pulse generating means 102. A plurality of ICs and various circuit components are mounted on the ceramic plate 133 to constitute a hybrid IC. These components are sometimes covered with a resin. ID0, ID1, and ID2 are used to set ID numbers for identification when a plurality of hybrid ICs are connected to this arrangement, and numbers from 0 to 6 are set. ID0 is the LSB to constitute a 3-bit configuration. Signals Rxd and Sck are used for communication. A signal PE is used to ON/OFF-control for the output of the half bridge circuit 103. FIG. 20 is a block diagram showing the arrangement of the control means. Referring to FIG. 20, a communicating means 135 communicates with the external command means. An analyzing means 136 analyzes communication information. A memorizing means 137 stores control parameters. The control parameters are directly supplied as control signals from the memorizing means 137 to the pulse generating means 102 to control the frequency of a pulse signal and ON/OFF-control the pulse signal. Synchronous serial communication is used to communicate with the external command means (not shown). However, a known RS232C, USB, or various parallel communications may be used. FIG. 21 shows the waveforms of signals in synchronous serial communication. A command from the external command means is transmitted over the signal Rxd and transferred in synchronism with the leading edge of the signal Sck. This synchronous communication allows high-speed serial transfer. Each command is composed of an ID number and a control command. When the IDs coincide with each other, the control command is executed. FIG. 22 shows a diagram showing how a plurality of vibration type actuator driving circuits, each identical to the one described above, are connected to each other. This arrangement includes driving circuits 138 to 144 for the above vibration type actuators and vibration type actuators 145 to 151. A unique ID number is set in the driving circuit for each vibration type actuator through an external electrode, and the signals Rxd and Sck are connected in parallel with all the vibration type actuator driving circuits. FIG. 23 is a timing chart showing the waveforms of communication signals in FIG. 22. The external command means outputs a command following the ID number. The driving circuits for all the vibration type actuators receive this, and each driving circuit compares its ID number with the received ID number. If they coincide with each other, the corresponding driving circuit determines that the command is addressed to the self-circuit, and executes it. In this case, the ID number "7" indicates the command addressed to the driving circuits for all the vibration type actuators. The driving circuits for all the vibration type actuators therefore execute the command. In the case shown in FIG. 23, the driving circuits for all the vibration type actuators receive a command to turn on pulse signals, the driving circuit for the vibration type actuator 138 (ID=0) receives a command to turn off the pulse signal, and the driving circuit for the vibration type actuator 141 (ID=3) receives a frequency command for the pulse signal. In this embodiment, the respective driving circuits for the vibration type actuators are formed on different ceramic plates. However, a plurality of driving circuits may be collectively formed on one ceramic plate.

Figure 24:
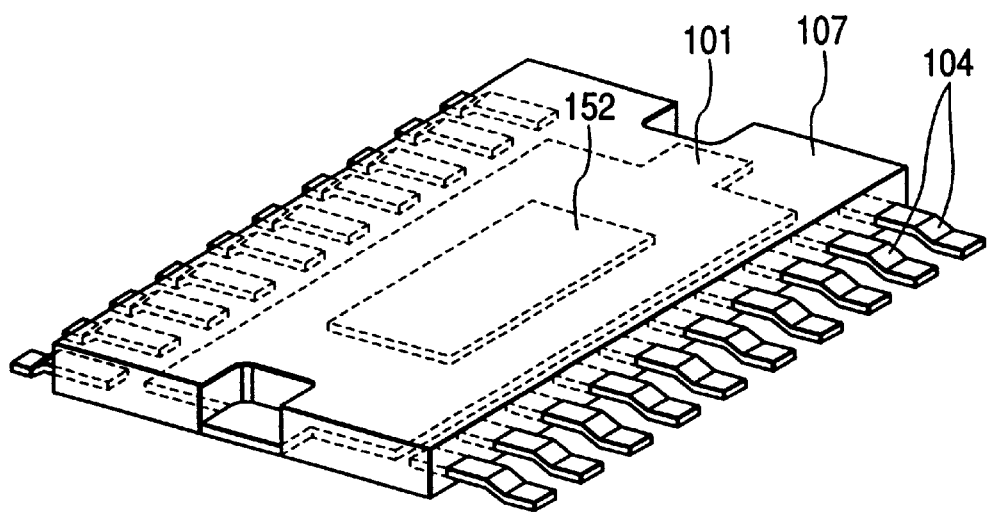
FIG. 24 is a view showing still another example of how a driving circuit of the present invention is mounted.
Figure 25:
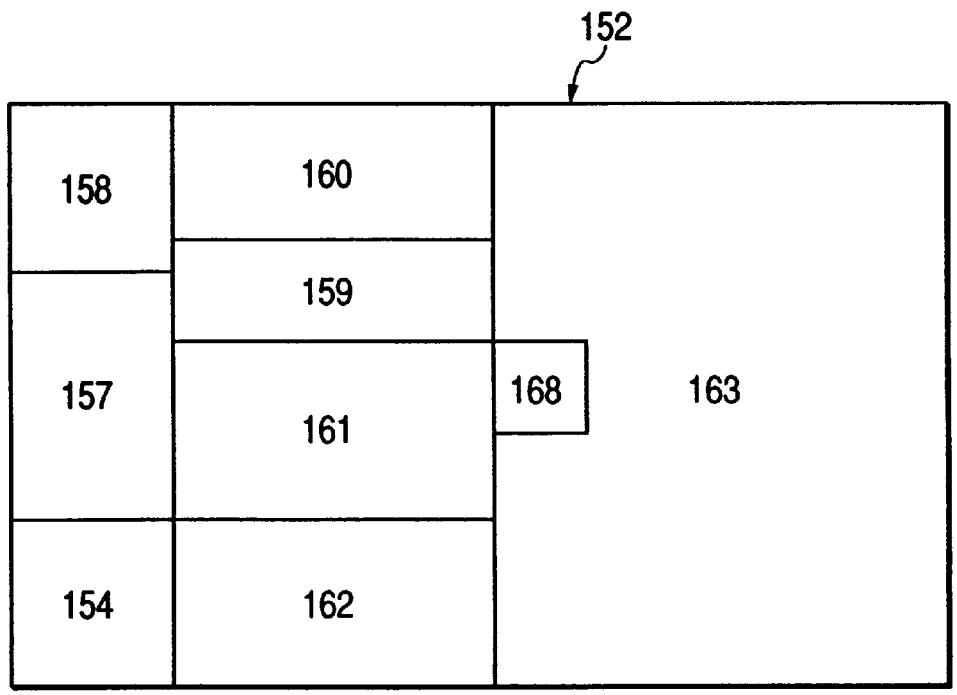
FIG. 25 is a view showing a layout on a silicon chip in FIG. 24.
Figure 26:
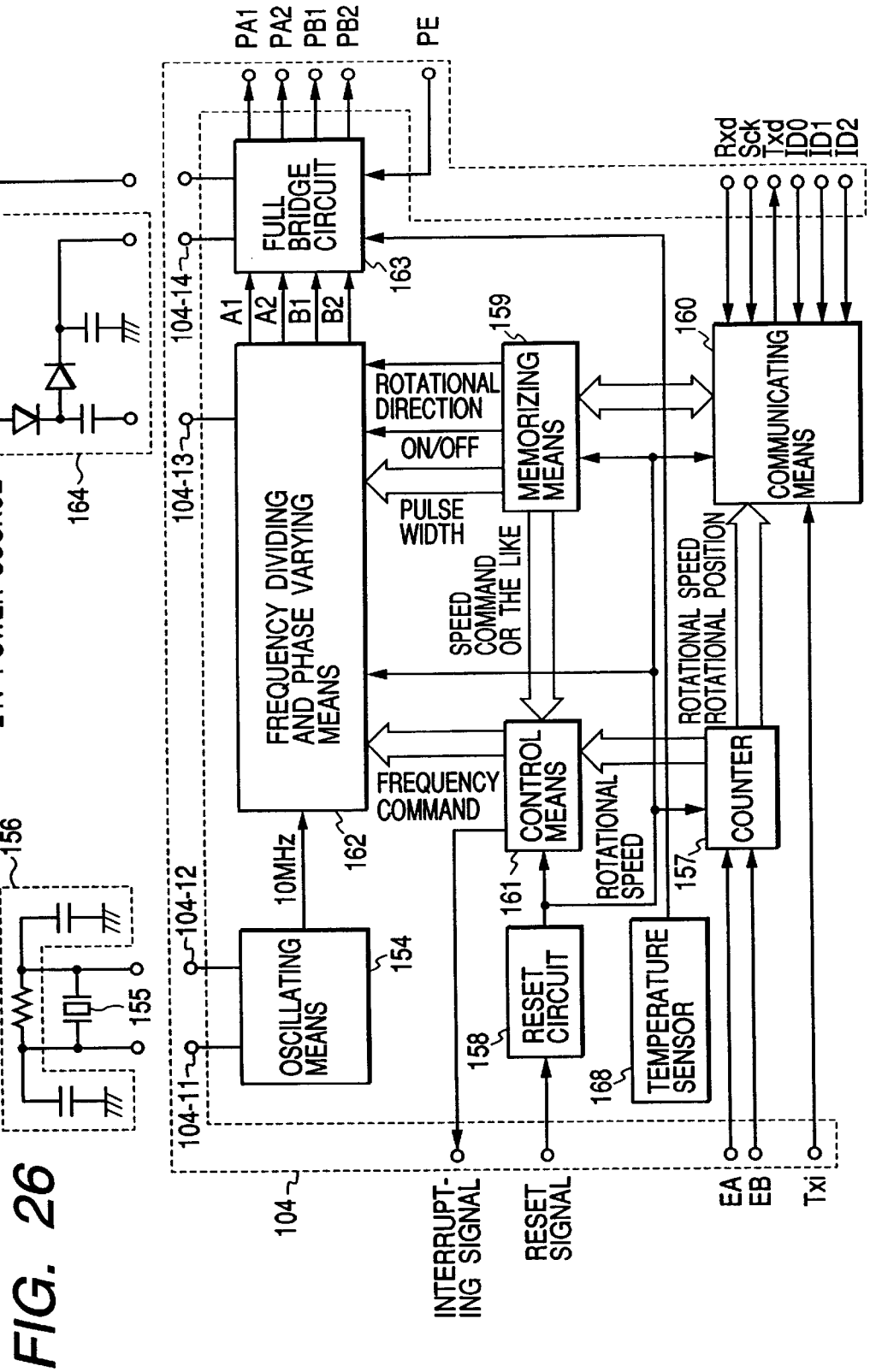
FIG. 26 is a block diagram showing the circuit arrangement of the chip in FIG. 25.
Figure 27:
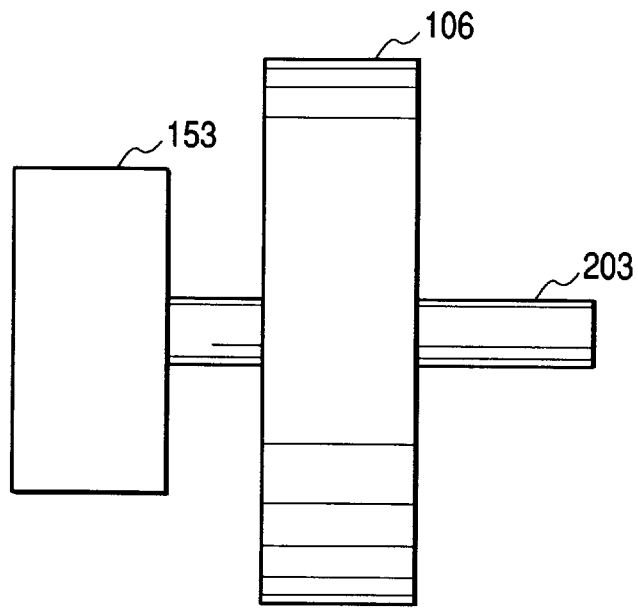
FIG. 27 is a view showing the arrangement of a vibration type actuator with a rotation sensor.
Figure 29:
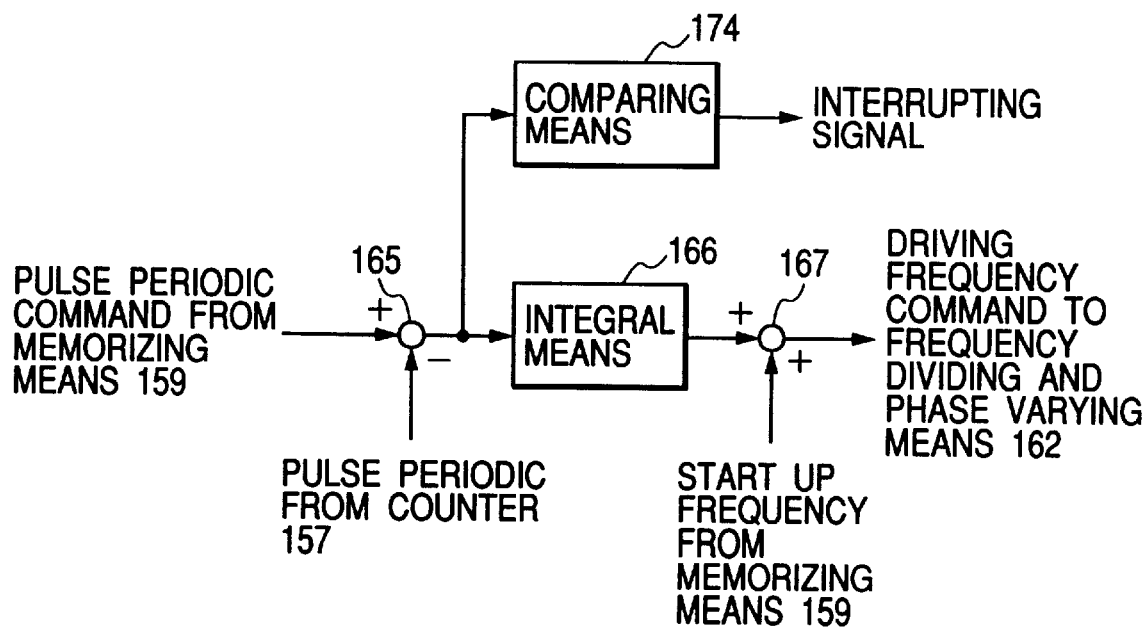
FIG. 29 is a block diagram showing an example of a control means in FIG. 26.
Figure 28:
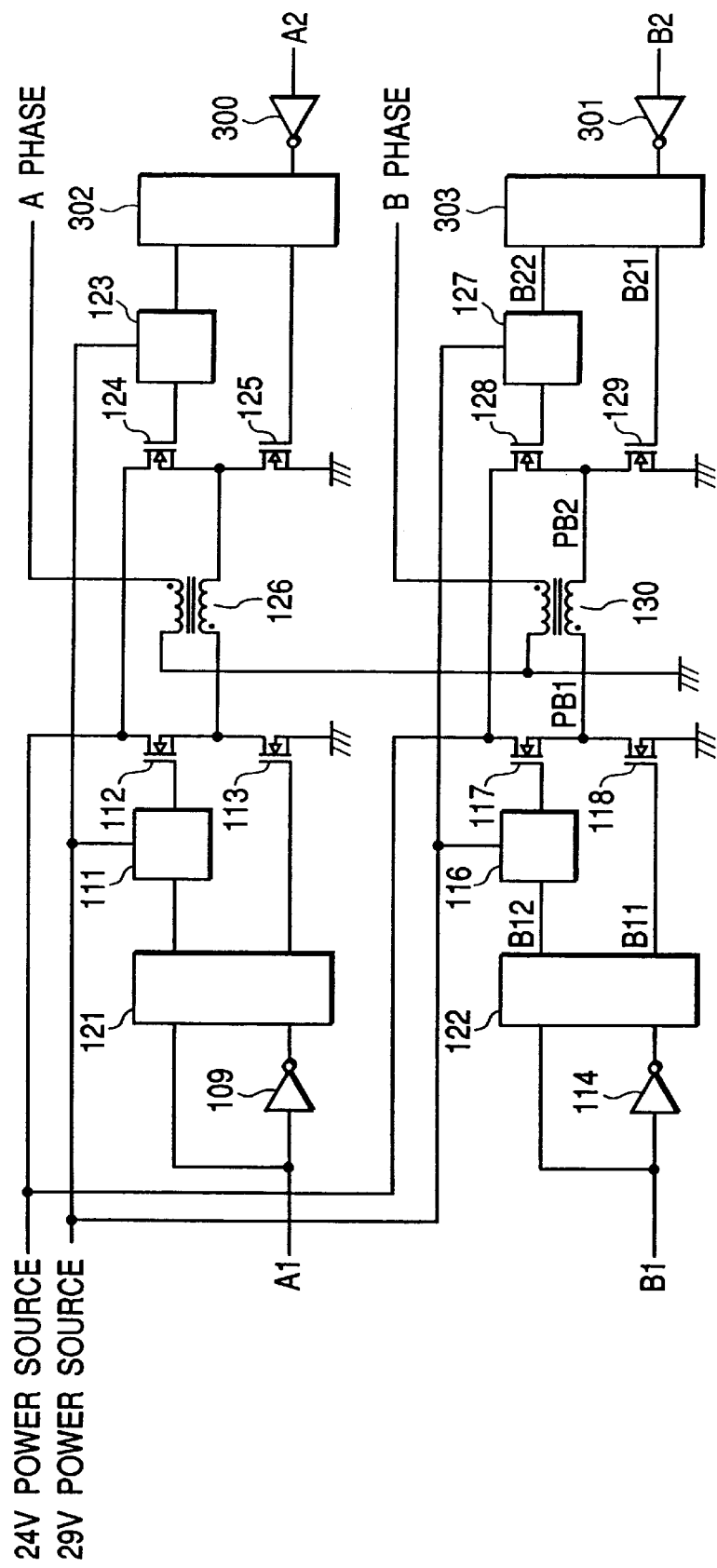
FIG. 28 is a block diagram showing an example of a full bridge circuit as an amplification means in FIG. 26.
Figure 30:
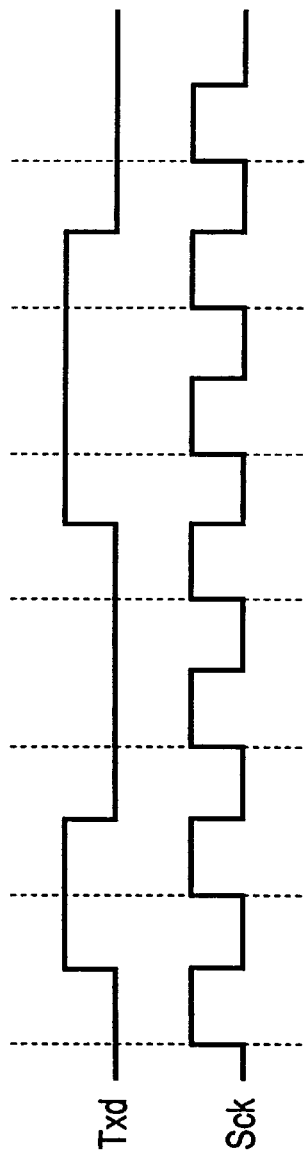
FIG. 30 is a timing chart showing transmission waveforms in a communicating means in FIG. 26.
Figure 32:
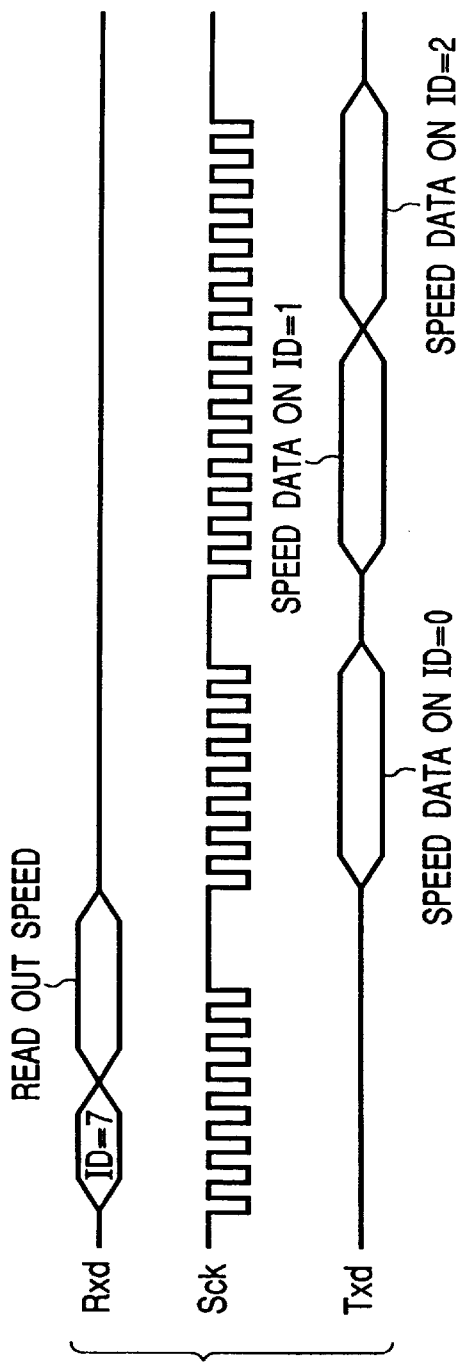
FIG. 32 is a timing chart showing the timing of communication with the driving circuits for the vibration type actuators in FIG. 31.
Figure 31:
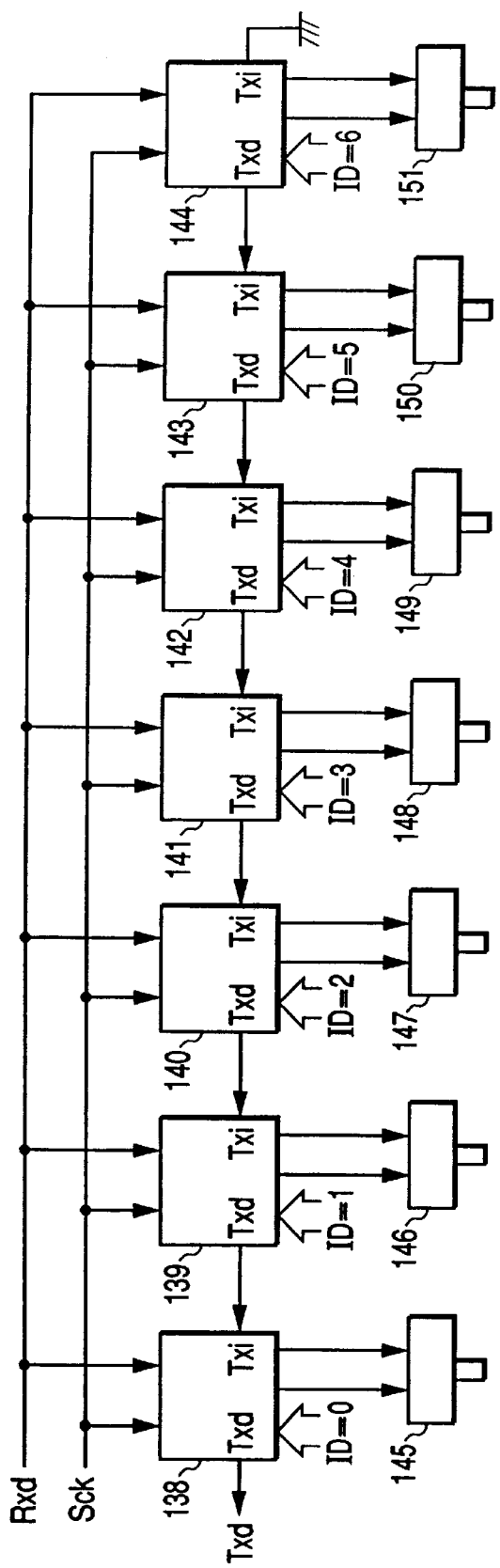
FIG. 31 is a block diagram showing how a plurality of driving circuits for vibration type actuators are connected to each other.
Figure 45:
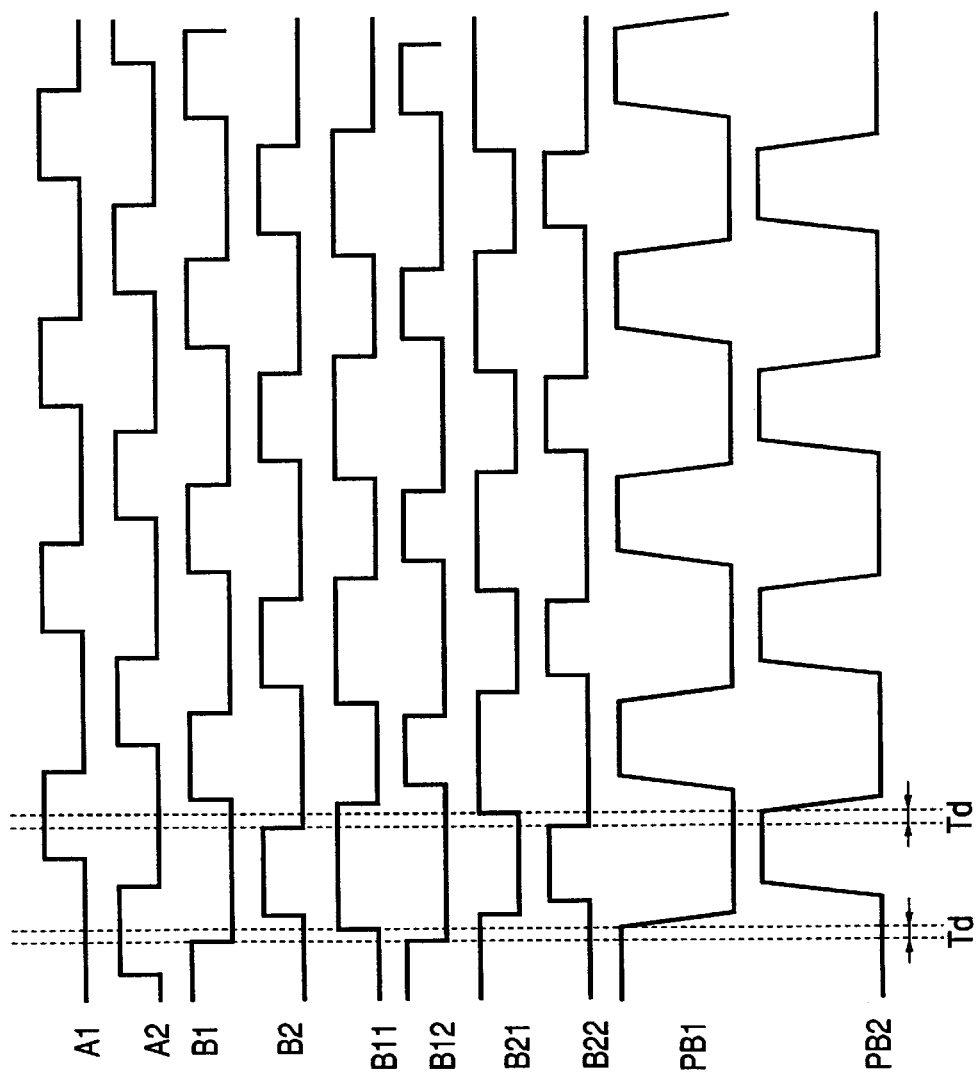
FIG. 45 is a timing chart showing the operation of a full bridge circuit in FIG. 43.

FIG. 24 shows a driving circuit according to still another embodiment of the present invention. A silicon chip 152 which is integrated with a driving circuit for a vibration type actuator is arranged as an IC. This chip is molded by a resin 107. The silicon chip 152 is formed on a metal plate 101 as a heat radiation means. The surface of the metal plate 101, except for the surface opposite to the surface on which the silicon chip 152 is mounted, is molded by the resin 107, and the opposite surface of the metal plate 101 which is not molded by the resin 107 is soldered to a wide heat radiation ground pattern formed on a glass epoxy board such as an FR4 board or a larger heat radiation metal plate is pressed against the opposite surface. The metal plate may be a ceramic plate. FIG. 25 shows a circuit layout on the silicon chip 152. Referring to FIG. 25, each circuit block forms a division on the silicon chip 152. The silicon chip 152 has a size of about 4 mm×6 mm and is formed under a rule of line width of 0.6 $\mu$m or less. FIG. 26 shows how the respective blocks in FIG. 25 are connected to each other. FIG. 27 shows the structure of the vibration type actuator. The structure of the vibration type actuator will be described below with reference to FIG. 27 first, and the operation of each block in FIG. 25 will be described next with reference to FIG. 26. Referring to FIG. 27, a known optical rotary encoder 153 detects the rotation of the vibration type actuator. When predetermined AC voltages are applied to the A and B phases, a rotor 201 (not shown) of a vibration type actuator 106 rotates. This rotation is transferred to the optical rotary encoder 153 through a rotating shaft 203 connected to the rotor 201. As a consequence, a pulse signal having a frequency corresponding to the rotational speed of the vibration type actuator 106 is output. Referring to FIG. 26, an oscillating means 154 is an oscillator to which a vibrator is connected through external electrodes 104-11 and 104-12. An oscillator 155 is made of quartz or a ceramic material. A phase compensating circuit 156 is comprised of a resistor and capacitors. A counter 157 measures the period of a pulse signal output from the optical rotary encoder 153. A reset circuit 158 resets each component in the silicon chip 152 in accordance with a reset signal. A memorizing means 159 such as a flash ROM stores initialization information. This arrangement also includes a communicating means 160. A control means 161 controls the optical rotary encoder 153 such that the period of an output pulse form the optical rotary encoder 153 becomes equal to a period corresponding to a speed command from the external command means (not shown). A frequency dividing and phase varying means 162 outputs a four-phase pulse signal in synchronism with a 10-MHz clock output from the oscillating means 154 on the basis of a frequency command from the control means 161. A full bridge circuit 163 is used for power amplification. The arrangement further includes a charge pump circuit 164. A temperature sensor 168 is used to detect the temperature of the silicon chip. Referring to FIG. 26, when an external 5V power source (not shown) (other than the power source for the full bridge circuit 163) is supplied through electrodes 104, the reset circuit 158 keeps sending a reset signal to the frequency dividing and phase varying means 162, the control means 161, the communicating means 160, the memorizing means 159, and the counter 157 for a predetermined period of time. The communicating means 160 then reads out initialization information and set values from the memorizing means 159 and writes initialization data for the frequency dividing and phase varying means 162 and the control means 161 at operation setting addresses in the memorizing means 159, thereby initializing the respective components. The reset circuit 158 executes the same operation as that described above in response to the reset signal input through the electrodes 104. The reset circuit 158 is operated by setting the reset signal to low level for a predetermined period of time or more. This prevents the reset circuit 158 from malfunctioning due to noise. Although the full bridge circuit 163 is operated by a 24V power source, its output is kept OFF until a 5V power source voltage (not shown) is supplied. Malfunction of the full bridge circuit 163 is prevented regardless of the connection order of these two power sources. In addition, commands from the external command means (not shown) are transferred through the communicating means 160 to this driving circuit over a signal Rxd (reception data signal) and a signal Sck (sync signal) by synchronous serial communication at the timings shown in FIGS. 21 and 23. The commands are sent together with ID numbers ranging from 0 to 7 which are indicated by ID0, ID1, and ID2, and are executed when the ID numbers coincide with the ID numbers indicated by ID0, ID1, and ID2 from the electrodes 104. A signal Txd from the electrode 104 is a signal for transmitting the rotational speed detected by the counter 157 to the external command means (not shown). FIG. 30 is a timing chart of the signal Txd. Data is output in units of bits in synchronism with the signal Sck, i.e., the trailing edge of the signal Sck, as in the case of the signal Rxd in FIG. 21, and the external command means receives the signal Txd at the leading edge of the signal Sck. FIG. 31 is a block diagram showing an arrangement in which driving circuits for a plurality of vibration type actuators are connected to each other. The signal Txd is connected in series with the driving circuits for all the vibration type actuators, and an output Txd is input to an input Txi of the driving circuit for each upper vibration type actuator. Data is transmitted from only the driving circuit for the vibration type actuator which has an ID number coinciding with the ID number contained in the command sent over the signal Rxd to the external command means over the signal Txd, and data from each driving circuit having a larger ID number is relayed. Each driving circuit whose ID number does not coincide with the above ID number outputs the data from each driving circuit having a larger ID number without any change. That is, data are read out from the driving circuits whose ID numbers coincide with the above ID numbers in the increasing order of ID numbers. FIG. 32 is a timing chart showing the flow of an actual command. When ID=7 is set in synchronism with the signal Sck and a speed read command is transmitted from the external command means to the driving circuits for all the vibration type actuators, speed data is transmitted from the driving circuit 138 for the vibration type actuator corresponding to ID=0 of the next signal Sck by using a Txd signal line. Subsequently, data of ID=1 and ID=2 are transmitted. In a time zone in which the signal Sck includes no sync clock, the data that is transferred last is output to Rxd and Txd. Digital filters are inserted in the Rxd, Sck, and Txi inputs to remove pulse noise of 1 $\mu$sec or less such as switching noise, thereby taking measures against noise generated in the full bridge circuit 163. FIG. 28 shows an example of the circuit arrangement of the full bridge circuit 163. This arrangement includes inverters 300 and 301 and time delaying means 302 and 303 for preventing MOSFETs 124 and 125 or MOSFETs 128 and 129 from being simultaneously turned on. The full bridge circuit 163 requires a 29V power source in addition to a 24V power source to operate the N-channel MOSFETs 112, 117, 124, and 128 on the high side. This is because at least 24 V+4 V=28 V is required to keep the N-channel MOSFETs 112, 117, 124, and 128 on the high side ON even while the output of the full bridge circuit 163 is at 24 V. FIG. 45 shows the waveforms of signals at the respective portions. A delay time Td is set in each pulse, and the pulse width is set to a duty of 37.5%. The charge pump circuit 164 is a circuit for applying 29 V to the full bridge circuit 163 and connected to a silicon chip 152 through electrodes circuits 104-13 and.104-14. A frequency dividing and phase varying means 162 outputs a 500-kHz pulse signal having an amplitude of 6 to 8 V. A voltage of 29 V or higher is applied to the full bridge circuit 163. This voltage of 29 V or higher is applied to the high-side drivers 111, 116, 123, and 127. In this case, when the two power sources of 24 V and 5 V are supplied, and the external command means (not shown) outputs a command to rotate the vibration type actuator at a target speed, a driving frequency, a pulse width, a phase difference, and the like are set in accordance with the set values initially set by the reset circuit 158, and a plurality of pulses having different phases are output from the full bridge circuit 163. As shown in FIG. 28, these pulses are applied to a vibration type actuator 106 through transformers 126 and 130. As a consequence, the vibration type actuator 106 starts rotating, and a counter 157 detects the rotational speed. The detected rotational speed is compared with the target speed by the control means to control the driving frequency so as to bring the rotational speed close to the target speed. If the temperature of the silicon chip 152 rises near to the limit temperature during operation, a temperature sensor 168 operates to stop the operation of the full bridge circuit 163. When the temperature sensor 168 detects a temperature below the limit temperature, the full bridge circuit 163 resumes operation. The limit temperature is set between 120° C. and 150° C. For example, the full bridge circuit 163 stops operating at 135° C. or higher and is restored at 125° C. A diode element is used for the temperature sensor. The sensor is integrally formed near the center of the silicon chip 152. In addition, the full bridge circuit 163 can directly turn off the pulse by using an external signal PE. For example, this signal is used to turn off the full bridge circuit 163 when a large output current is externally detected. FIG. 29 is a block diagram of a control means 161. A subtraction means 165 detects the difference between the rotational speed from the counter 157 and the target speed from a memorizing means 159. An integral means 166 integrates the output from the subtraction means 165. An addition means 167 adds a startup frequency command value from the memorizing means 159 to the output from the integral means 166. A comparing means 174 compares the absolute value of the output from the subtraction means 165 with a predetermined value and outputs the result as an interrupting signal. As the rotational speed decreases, the period of a signal EA increases. The counter 157 therefore counts to a value larger than a count value corresponding to the target speed. The output from the subtraction means 165 becomes a negative value, and the integration result of the integral means 166 gradually decreases. As a consequence, the driving frequency decreases and approaches the resonance frequency, and the rotational speed increases. In this manner, the rotational speed of the vibration type actuator is controlled to the target speed. In addition, digital filters like those for the signals Rxd, Sck, an Txi are inserted for the input signals EA and EB to the counter 157, thus reducing the influences of noise. If the deviation between the target speed and the actual speed is large, the corresponding information is sent to the external command means by using an interrupting signal. In this embodiment, the driving circuit, mounted on a metal plate 101, for the vibration type actuator is integrally formed by using silicon. The full bridge circuit 163 has a DMOS structure, and other circuits are formed by a CMOS or bipolar process. In addition, in this embodiment, in the oscillating means 154, the oscillator 155 and the phase compensation circuit 156 are connected to each other through the electrodes 104. However, the vibrator 155 may be formed on the metal plate, together with other components, or the phase compensating circuit 156 may be formed on a silicon chip. Furthermore, as the oscillating means 154, an oscillating means used by the external command means used together with the vibration type actuator may be used, or an external independent oscillating means may be used. When the full bridge circuit 163 and the oscillating means 154 are to be integrated, since the full bridge circuit 163 generates heat, an oscillating means using a quartz oscillator, which has a low temperature dependency, can be effectively used for frequency stability. In this embodiment, the charge pump circuit 164 is not placed on the silicon chip 152. However, this circuit may be formed on the silicon chip.

Figure 33:
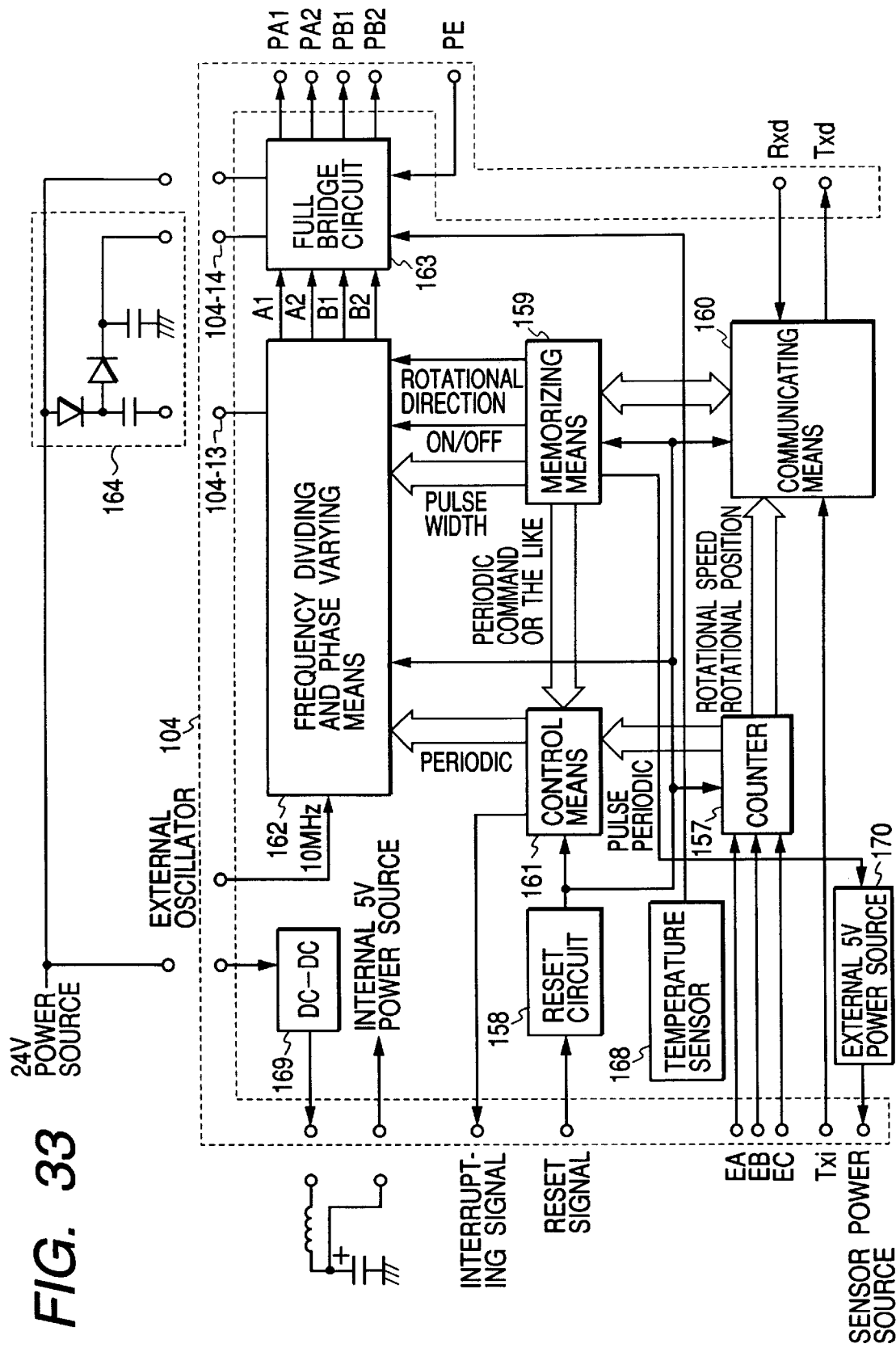
FIG. 33 is a block diagram showing the arrangement of mounted driving circuit.
Figure 34:
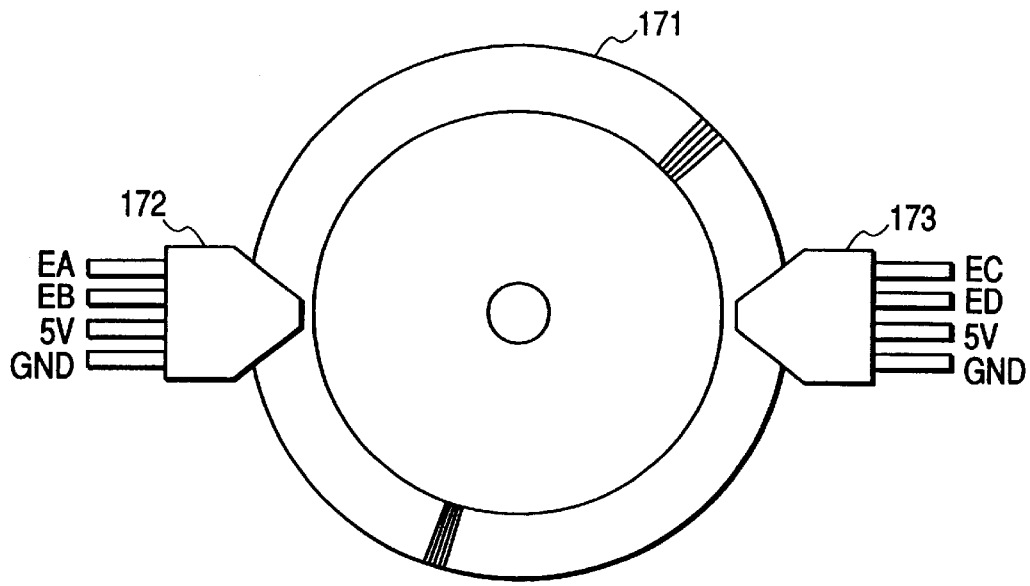
FIG. 34 is a view showing the arrangement of an optical encoder used together with the circuit in FIG. 33.
Figure 35:
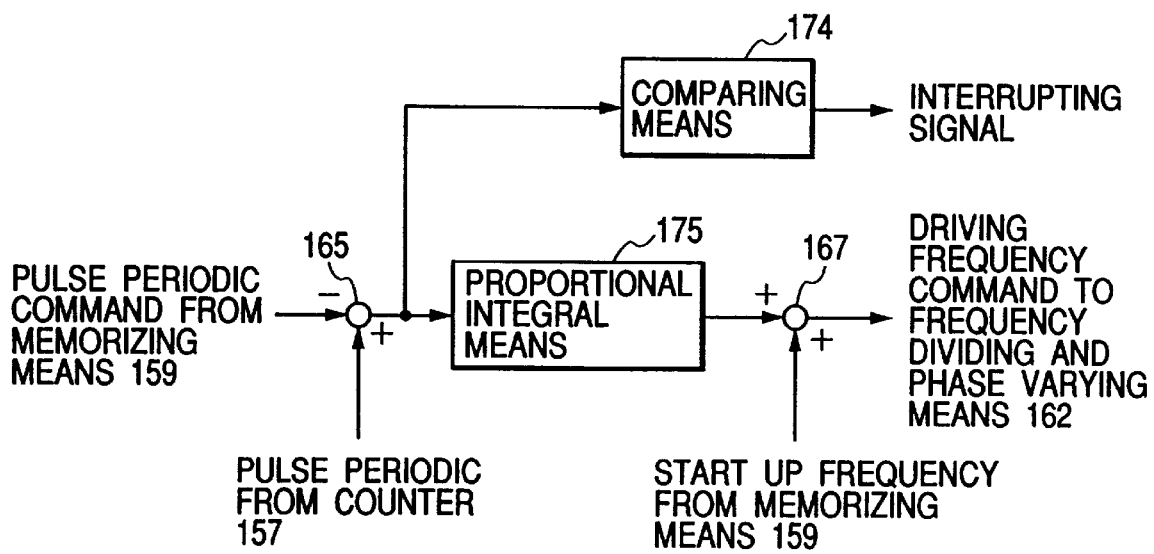
FIG. 35 is a block diagram showing another example of a control means in FIG. 33.
Figure 36:
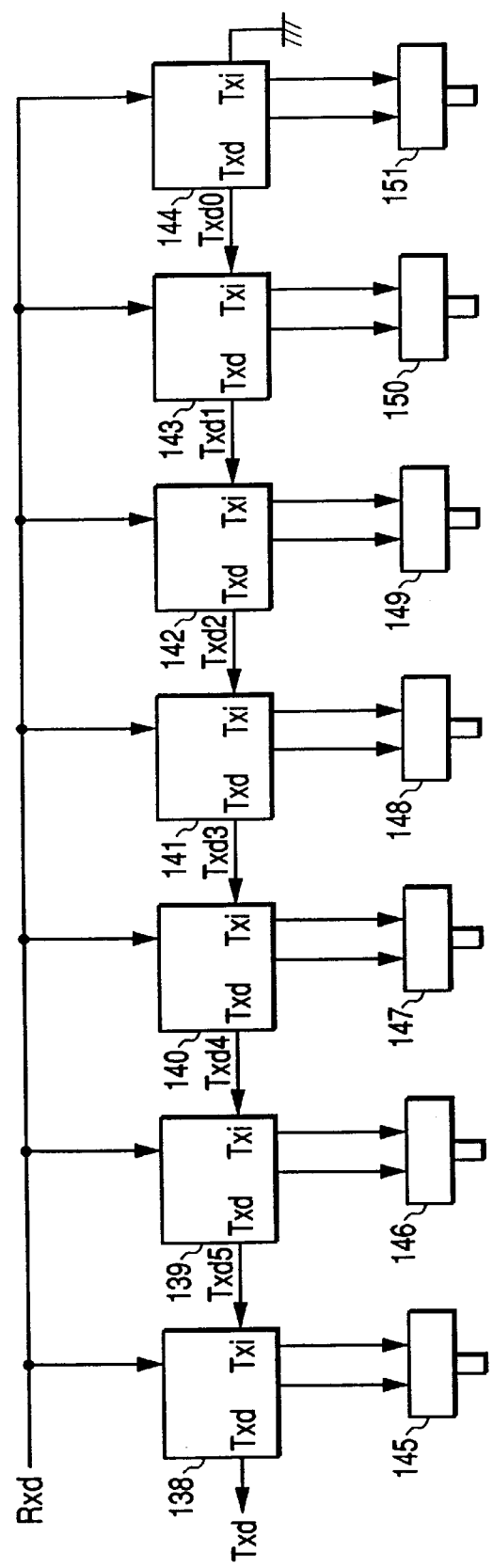
FIG. 36 is a block diagram showing how a plurality of driving circuits for vibration type actuators are connected to each other.
Figure 37:
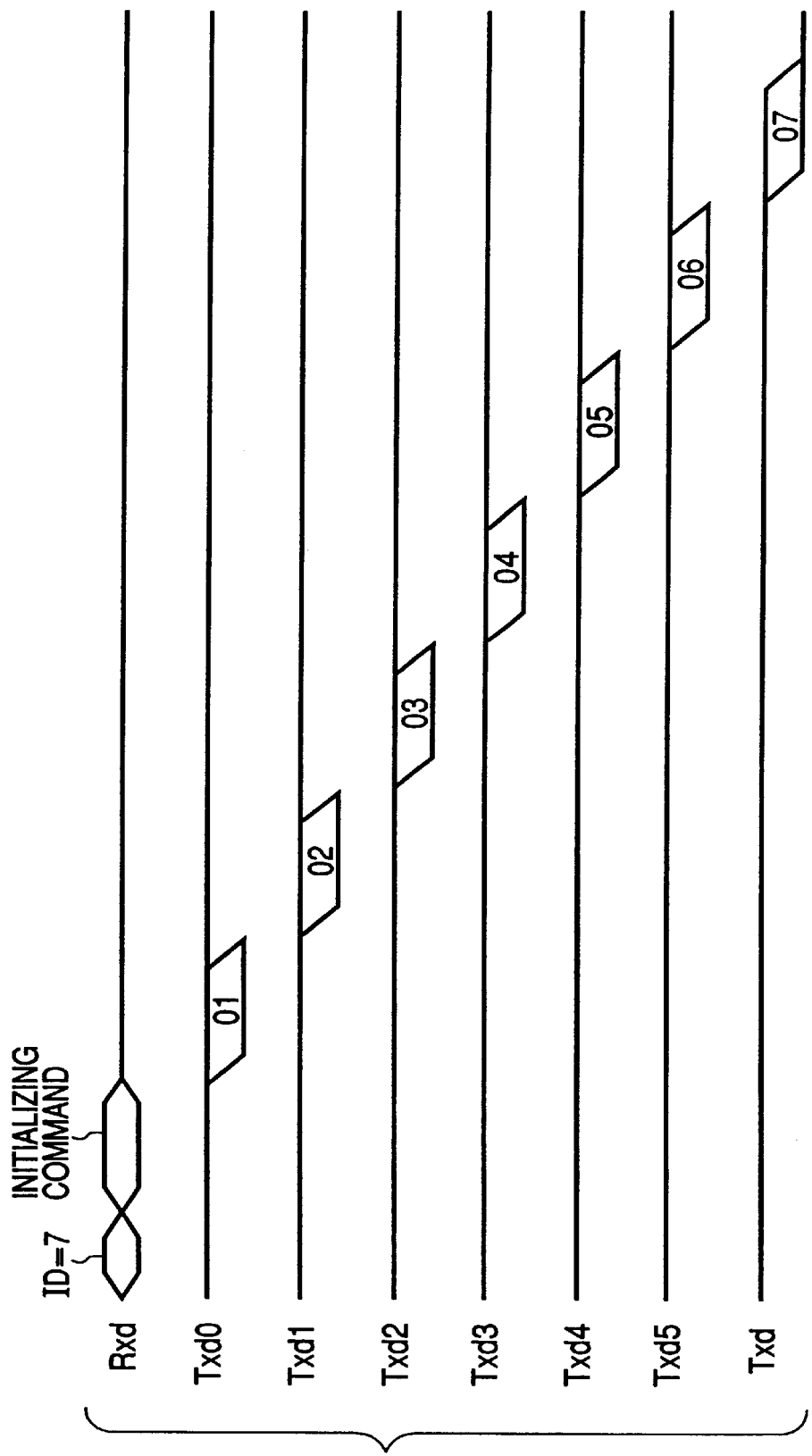
FIG. 37 is a timing chart showing how IDs are automatically determined for driving circuits for a plurality of vibration type actuators.
Figure 38:
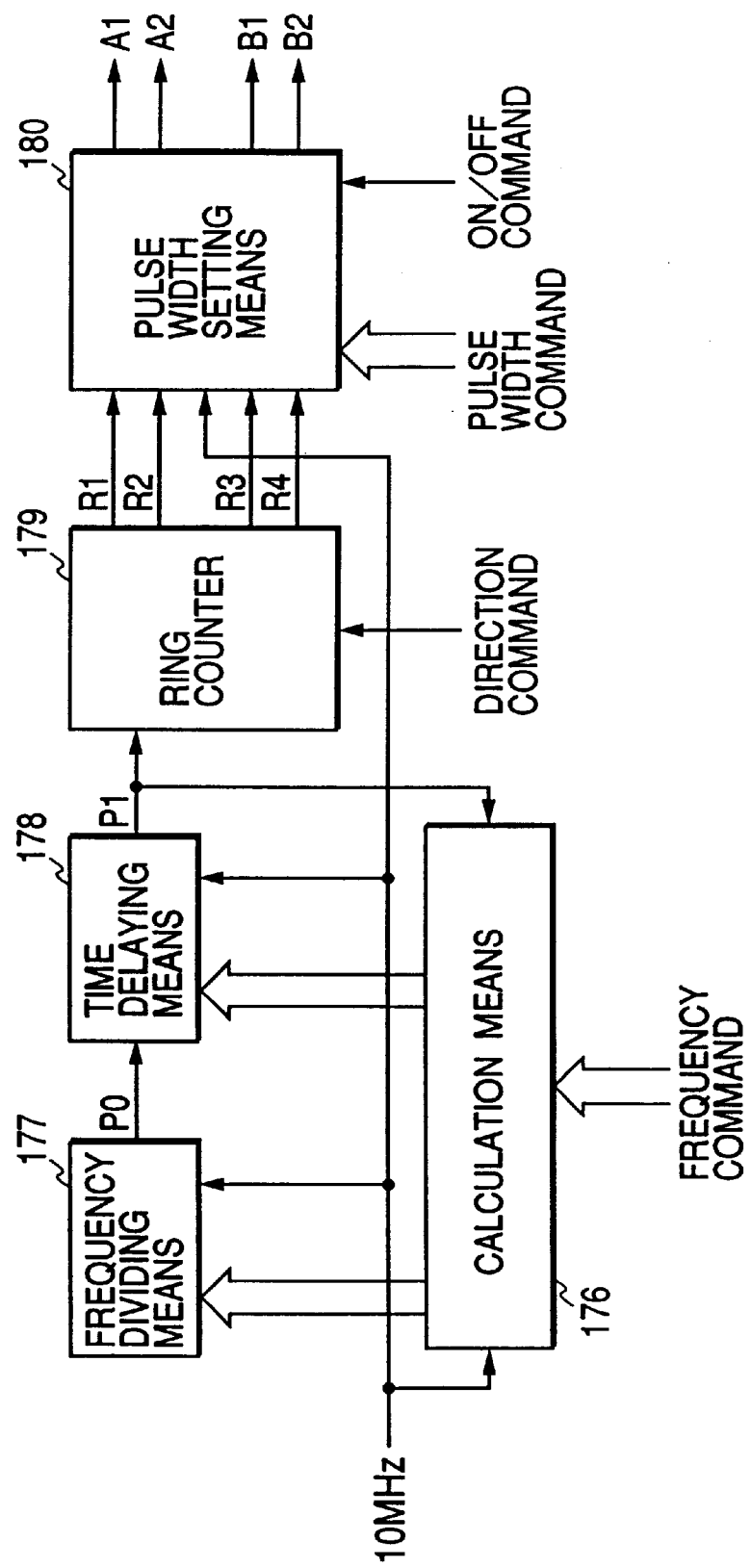
FIG. 38 is a block diagram showing an example of a frequency dividing and phase varying means.

FIG. 33 is a block diagram showing still another example of how a driving circuit is mounted. The entire lower surface of an electrode 104 is integrally formed on a silicon chip. A step-down type DC—DC converter 169 receives a 24V power source voltage and generates a 5V power source voltage and is connected to an external filter constituted by an inductor and a capacitor through the electrode 104. An external 5V power source 170 supplies a speed sensor power source voltage for a rotary encoder or the like (not shown) and is controlled by a power source signal set in a memorizing means 159. This control aims at saving power by turning off the sensor power source (not shown) when it is not necessary. An vibration type actuator 106 exhibits a large holding force when it is at rest, and hence is not moved by a certain disturbance. Even if, therefore, the power to the position detection means is turned off, no positional shift occurs when a power source is supplied before the vibration type actuator is restarted. A counter 157 detects the position and rotational speed of the vibration type actuator by using three output signals from a rotary encoder 153. The counter 157 detects the position from pulse signals EA and EB having a phase difference of 90°, and calculates the speed by detecting the average of the periods of the output pulses EA and EC on the basis of pieces of independent speed information of the pulse signals EA and EC. FIG. 34 shows the arrangement of the rotary encoder 153. A chart plate 171 is mounted on a rotating shaft 203. Optical sensors 172 and 173 detect calibration markings recorded on the chart plate 171 and output two-phase pulse signals 90° out of phase. The optical sensors 172 and 173 are respectively placed at opposing positions on the chart plate 171 to cancel out the influences of the eccentricity of the chart plate 171 mounted on the rotating shaft 203. The optical sensor 172 outputs signals EA and EB, and the optical sensor 173 outputs signals EC and ED. Speed control with small rotation variations can be implemented by using the signals EA and EC for speed detection even if the mount precision of the chart plate 171 with respect to the rotating shaft 203 is low to some extent. A communicating means 160 communicates with an external command means (not shown) by asynchronous serial communication. Asynchronous serial communication includes start-stop synchronization communication using RS232C, Ethernet used for USB or LAN, which has currently attracted a great deal of attention, and the like. Although this embodiment exemplifies the communication using RS232C, communication can be performed by other schemes. FIG. 35 shows an example of the control means 161. A proportional integral means 175 adds the value obtained by integrating the difference between the pulse frequency command set in the memorizing means 159 and the pulse period detected by the counter 157 at a predetermined timing to the value obtained by multiplying the difference by a predetermined gain, and outputs the resultant data. The integration timing and gain used in this case are set in the memorizing means 159. The counter 157 counts the numbers of pulses of EA and EC within a predetermined period of time and calculates the average of the numbers, thereby calculating a rotational speed. If the rotational speed is higher than the target speed, the output from a subtraction means 165 becomes a negative value. Since both the value obtained by integrating this output and the value obtained by multiplying the output by a gain become negative values, the output from the proportional integral means 175, which is obtained by adding these values, also becomes a negative value. Therefore, the pulse period of the driving frequency decreases, and the driving frequency of the vibration type actuator 106 increases and deviates from the resonance frequency of the vibration type actuator. As a consequence, the rotational speed gradually decreases and approaches the target speed. The communicating means 160 analyzes commands from the external command means to store various settings in the memorizing means 159 in accordance with the commands, or transmits a value set in the memorizing means 159, or the rotational position information, rotational speed, or the like detected by the counter 157 over a signal Txd. FIG. 36 is a block diagram showing an example of how driving circuits for a plurality of vibration type actuators are connected to each other. No ID numbers are set in driving circuits 138 to 144 for vibration type actuators, but ID numbers are automatically set in accordance with commands. A signal Rxd is used to receive a command from the external command means. Commands and data are sent in the RS232C communication form. A signal Txd is connected in series with the driving circuits for the respective vibration type actuators, and data from the driving circuits are sequentially transmitted to the external command means in the order of selected ID numbers on the basis of the information from the driving circuit 138. FIG. 37 is a timing chart showing how ID numbers are automatically set. In the initial state, Txd of each driving circuit outputs 5 V. Only Txi of the driving circuit 144 is set at 0 V. When an initializing command is transmitted at ID=7 (indicating a command to all the driving circuits), ID=0 is set in the driving circuit 144 whose input Txi is set at 0 V, and the driving circuit 144 transmits data 01 to the driving circuit 143. ID=1 is then set in the driving circuit 143 and the driving circuit 143 transmits data 02 to the driving circuit 142. In this manner, ID=6 is set in the last driving circuit 138, and all the driving circuits are sequentially set from ID=0. The driving circuit 138 adds 1 to its ID number and transmits the resultant data to the external command means. The external command means receives data representing the number of driving circuits to be connected. In this case, each ID number consists of three bits. However, each ID number may consist of eight bits to send ID=255 as a command to all the driving circuits. FIG. 38 shows an example of the arrangement of a frequency dividing and phase varying means 162. A means for generating a 500-kHz pulse for a charge pump circuit 164 is omitted.

The arrangement of the frequency dividing and phase varying means in FIG. 38 is the same as that in the circuit block of FIG. 2, and the arrangements of the respective blocks are the same as those of the circuits shown in FIGS. 4, 5, and 6. For this reason, a description of these circuits will be omitted.

Figure 44:
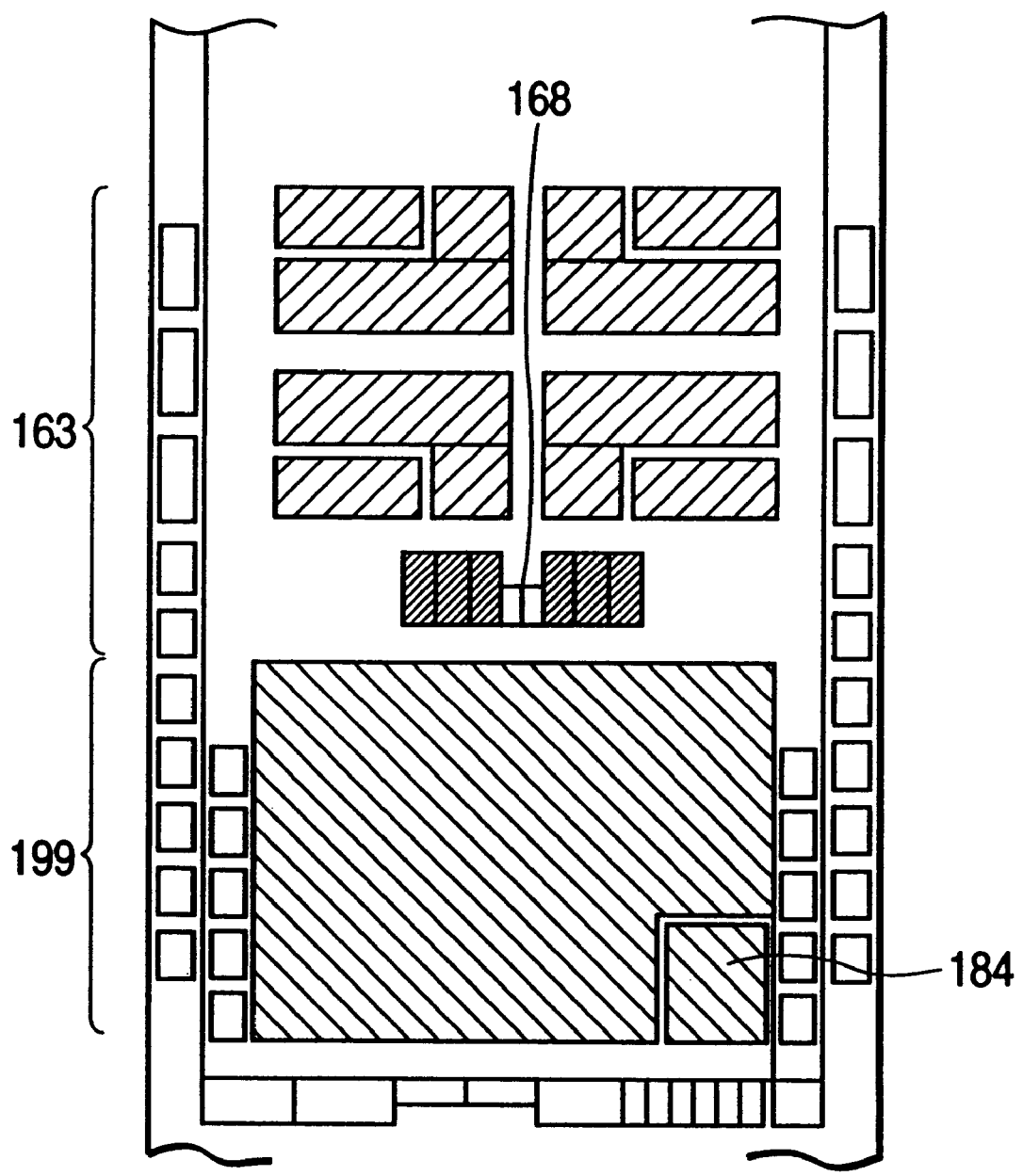
FIG. 44 is a view showing the layout of circuits in FIG. 43 on a silicon chip.

FIG. 44 shows the layout of the respective blocks on a silicon chip. A full bridge circuit 163 occupies a half of the surface of the chip, and a temperature sensor is placed almost in the center of the chip. A ring oscillator 184 is placed in a small division at a corner of the chip. Digital circuits are arranged on most of the remaining surface, and all the functions are collected in one chip. Pads to be connected to external electrodes are formed on the peripheral portion of the chip.

Figure 39:
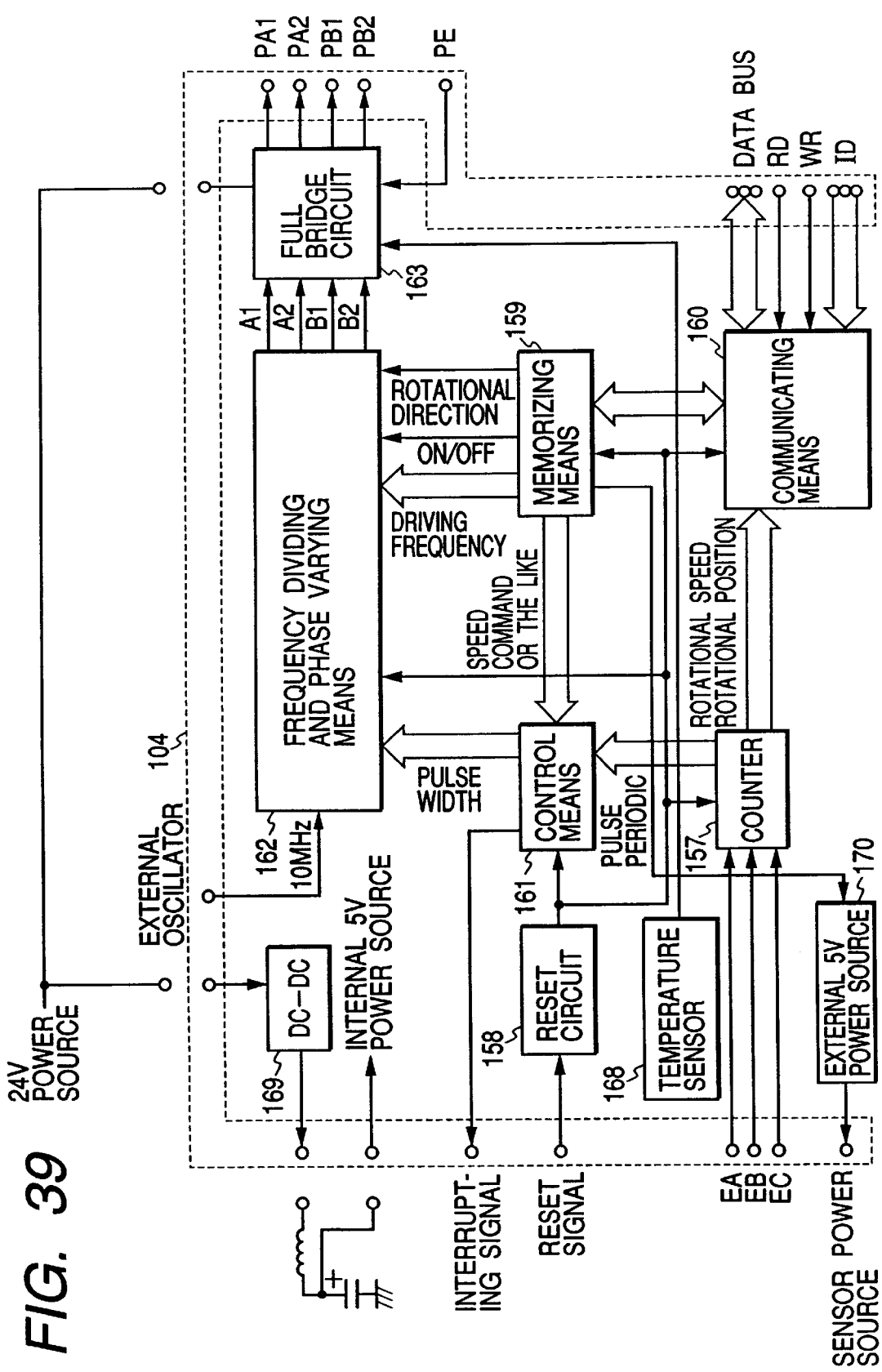
FIG. 39 is a block diagram showing still another example of a mounted driving circuit.
Figure 40:
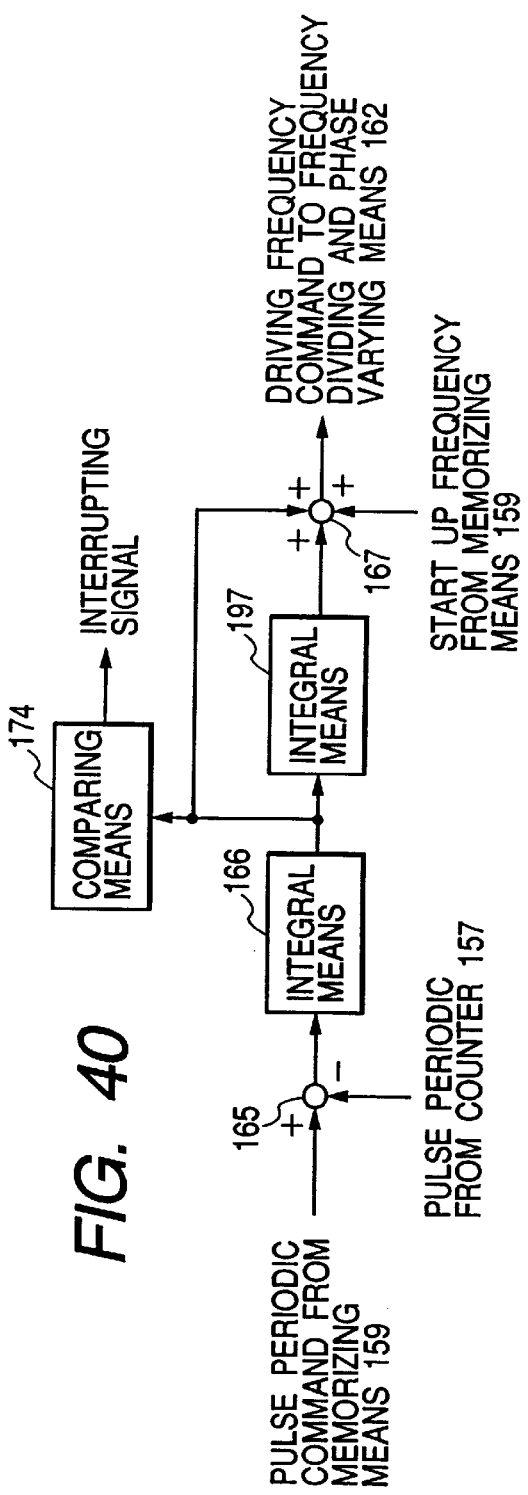
FIG. 40 is a block diagram showing an example of a control means in FIG. 39.
Figure 42:
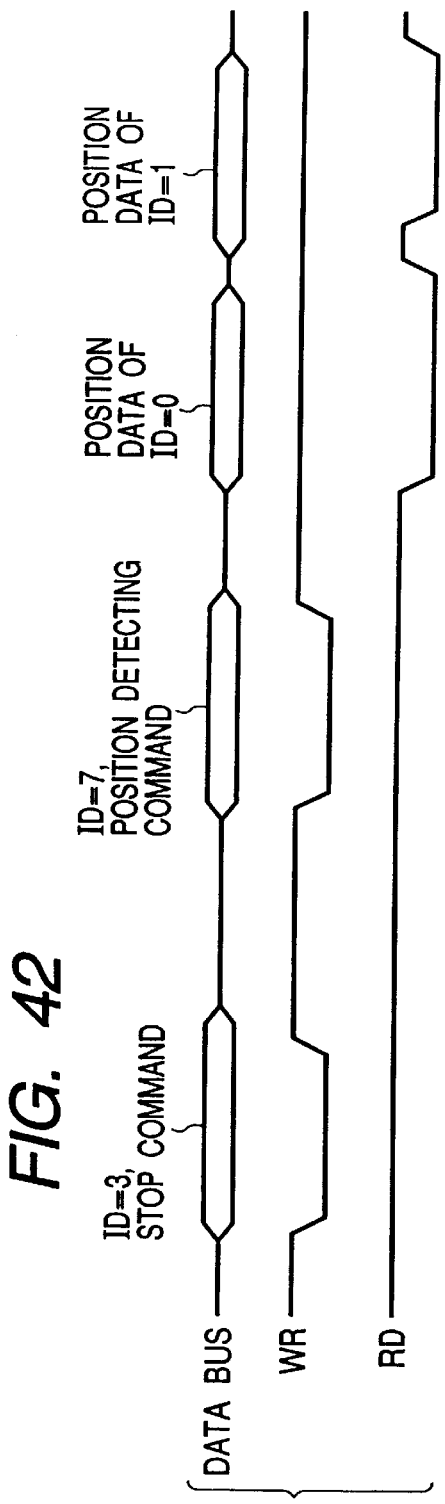
FIG. 42 is a timing chart showing the timing of communication with the driving circuits for the vibration type actuators in FIG. 41.
Figure 41:
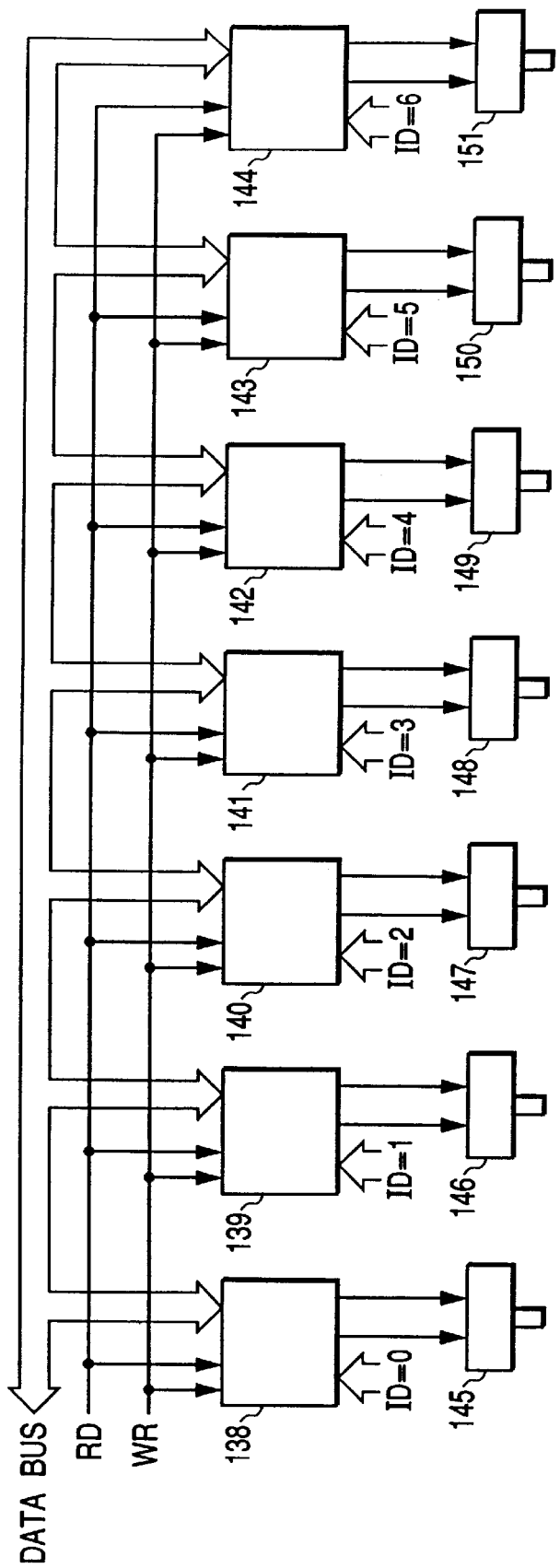
FIG. 41 is a block diagram showing how a plurality of driving circuits for vibration type actuators are connected to each other.

FIG. 39 is a block diagram showing still another example of how a driving circuit is mounted. For example, this arrangement differs from the arrangement shown in FIG. 33 in that a communicating means 160 performs parallel communication, a full bridge circuit 163 includes a charge pump circuit, and a pulse width is controlled, instead of a driving frequency, by a control means 161. The control means 161 performs speed control by changing at least the pulse width of one of four-phase pulse signals. FIG. 40 is a block diagram showing the control means 161. An integral means 197 further integrates an output from an integral means 166. In this case, when the rotational speed of the vibration type actuator becomes high, the output from a subtraction means 165 becomes a negative value. The integral means 166 therefore starts integrating in the negative direction. As a consequence, the result obtained by adding the outputs from the integral means 197 and 166 and the initial pulse width using an addition means 167 gradually decreases, and the pulse width command decreases. This decreases the rotational speed of the vibration type actuator. In this manner, the rotational speed is controlled. When the absolute value of the output from the integral means 166 exceeds a predetermined value, a comparing means 174 generates an interrupting signal. FIG. 41 is a block diagram showing an arrangement in which driving circuits for a plurality of vibration type actuators are connected to each other. A parallel data bus is connected in parallel with all the vibration type actuators, and both write and read signals WR and RD are also connected in parallel with the vibration type actuators. FIG. 42 is a timing chart for communication. The data bus is bidirectional and switched in accordance with the signal WR or RD. The first command sent to the data bus is a stop command addressed to only ID=3. The next command corresponds to ID=7 and is addressed to the driving circuits for all the vibration type actuators. This command is used to read out the current positions. The position data are read out in the order of the ID numbers. The number of pulses of the signal RD is counted to detect the timing at which data is output from each driving circuit. The communication speed can be increased by using parallel communication as compared with the case of serial communication.

Figure 43:
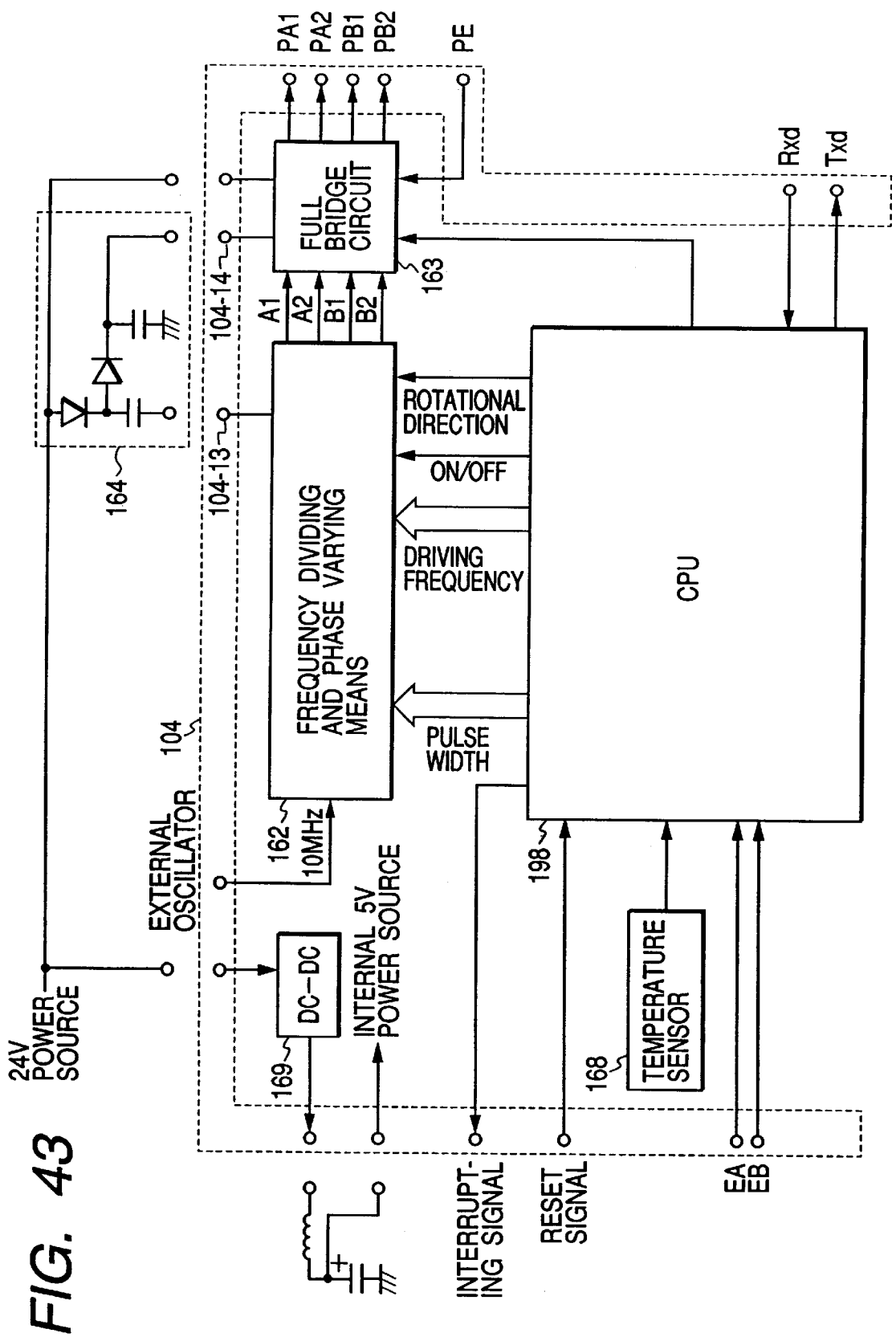
FIG. 43 is a block diagram showing still another example of a mounted driving circuit.
Figure 46:
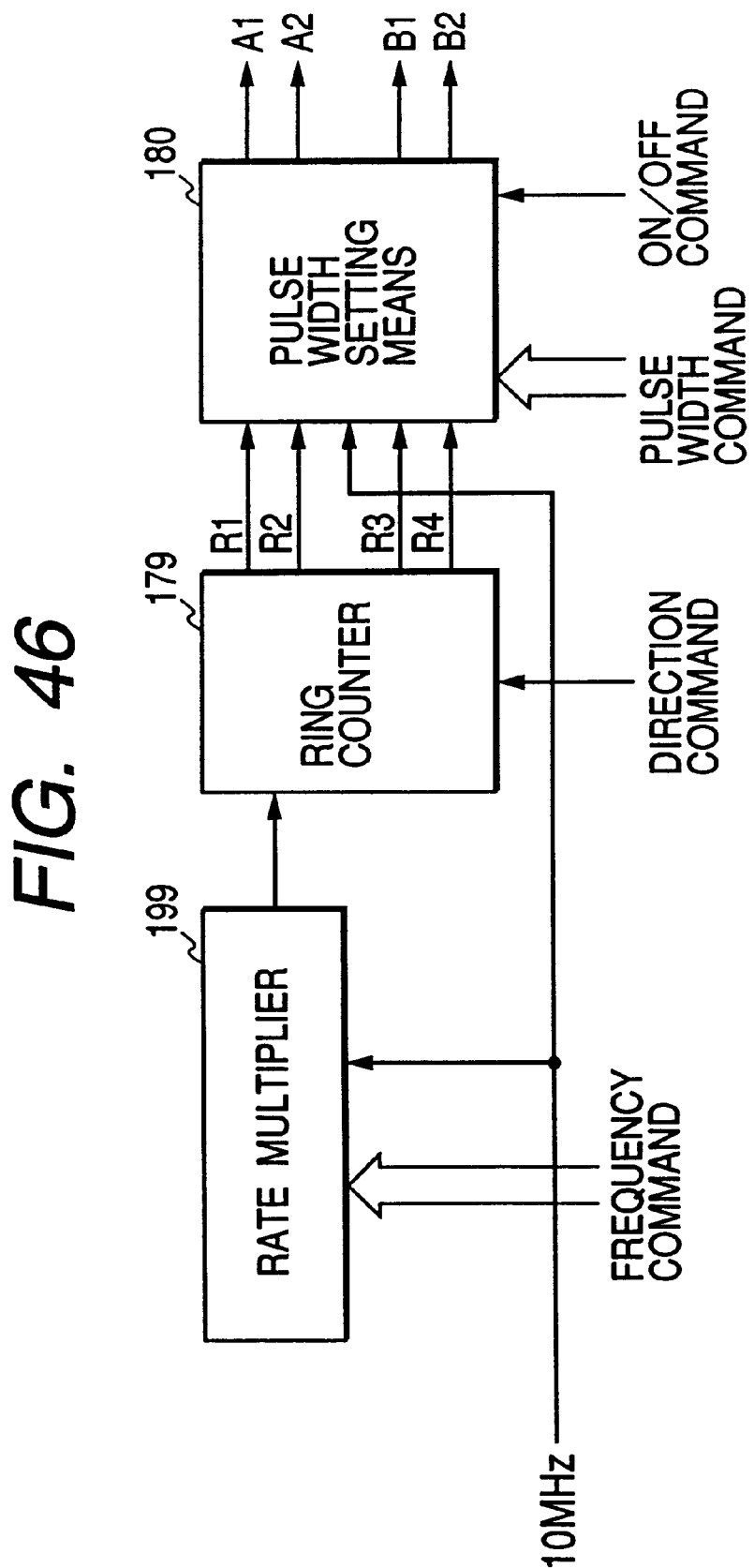
FIG. 46 is a block diagram showing an example of a frequency dividing and phase varying means in FIG. 43.

FIG. 43 is a block diagram showing still another example of how a driving circuit is mounted. A CPU 198 includes a counter, a serial communication function, a ROM, a RAM, and a reset circuit. A recent CPU incorporates various functions. If this CPU and peripheral circuits such as a full bridge circuit 163 as a power amplification means and a frequency dividing and phase varying means 162 are integrated, even complicated control can be flexibly handled. In addition, if a digital circuit portion including the frequency dividing and phase varying means 162 is formed by using an FPGA or the like and integrated into a chip, a compact, versatile driving circuit for a vibration type actuator can be realized. FIG. 46 shows the arrangement of the frequency dividing and phase varying means 162. A rate multiplier 199 generates pseudo-frequencies, which cannot be obtained by frequency division alone, by finely changing the frequency dividing ratio. This allows implementation of a fully digital pulse generating section, and hence can provide a more stable oscillating means. The rate multiplier 199 generates a pulse signal having a frequency four or eight times the driving frequency of the vibration type actuator, and this signal is converted into four-phase pulse signals which are 90° out of phase with each other and have a pulse width determined by a pulse command by using a ring counter 179 and a pulse width setting means.

What is claimed is:

1. A driving apparatus of a vibration type actuator for applying a driving signal to an electro-mechanical energy conversion element portion of a vibration member so as to excite vibration in the vibration member of said vibration type actuator, comprising:

a reference pulse generating circuit for generating a reference pulse signal;

a frequency dividing circuit for outputting a pulse signal having a period of an integer multiple of a period of the reference pulse signal;

a time delaying circuit for forming a delayed pulse signal by changing a shift amount of an edge of a pulse signal from said frequency dividing circuit on the basis of delay data every time a pulse signal is output from said frequency dividing means, said time delaying circuit including pulse forming means for forming a plurality of pulses shifted from each other on a unit time basis and selecting means for selecting one of the pulses formed by said pulse forming means on the basis of delay data, said time delaying circuit forming a pulse signal corresponding to a period of the selected pulse as the delayed pulse signal; and a driving circuit for applying a driving signal to said electro-mechanical energy conversion element portion at a frequency corresponding to the delayed pulse signal.

2. An apparatus according to claim 1, wherein said pulse forming means is a PLL circuit for forming a phase-locked pulse by performing phase comparison with a pulse having a period corresponding to the reference pulse, and includes a ring oscillator for forming the plurality of pulses by shifting the phase-locked pulse on a unit time basis in a loop of said PLL circuit.

3. An apparatus according to claim 1, wherein said pulse forming means is a ring oscillator which oscillates at a predetermined frequency in synchronism with the reference pulse signal, said oscillator being constituted by an odd number of logic inverting means connected in a ring form and controlled such that each inverting means has a predetermined unit delay time.

4. An apparatus according to claim 3, wherein said selecting means outputs a delayed pulse having an arbitrary delay time of an integer multiple of the unit delay time by selecting one of output signals from said plurality of logic inverting means on the basis of the delay data.

5. An apparatus according to claim 4, wherein an oscillation frequency of said ring oscillator is ½ a frequency of the reference pulse signal.

6. An apparatus according to claim 5, wherein the number of series-connected logic inverting means of said ring oscillator is $2^N-1$ (N is an integer of not less than two).

7. An apparatus according to claim 4, wherein said selecting means includes exclusive OR means for matching logic levels of outputs from even- and odd-numbered logic inverting means, pulse edge selecting means for extracting a necessary signal edge, and gate pulse generating means for generating a gate pulse for permitting selection, said pulse edge selecting means selecting a signal with a designated delay time, said exclusive OR means outputting the selected signal upon switching between inversion and noninversion depending on whether the selected signal is an output signal from said odd-numbered logic inverting means, and the gate pulse being used to select and output a leading edge or trailing edge of the signal.

8. A pulse signal generating circuit for a driving apparatus of a vibration type actuator for applying a driving signal to an electro-mechanical energy conversion element portion of a vibration member so as to excite vibration in the vibration member of said vibration type actuator, comprising:

a reference pulse generating circuit for generating a reference pulse signal;

a frequency dividing circuit for outputting a pulse signal having a period of an integer multiple of a period of the reference pulse signal; and a time delaying circuit for forming a delayed pulse signal by changing a shift amount of an edge of a pulse signal from said frequency dividing circuit on the basis of delay data every time a pulse signal is output from said frequency dividing means, said time delaying circuit including pulse forming means for forming a plurality of pulses shifted from each other on a unit time basis and selecting means for selecting one of the pulses formed by said pulse forming means on the basis of delay data, said time delaying circuit forming a pulse signal corresponding to a period of the selected pulse as the delayed pulse signal, and the driving signal being formed by the delayed pulse signal.

9. A circuit according to claim 8, wherein said pulse forming means is a PLL circuit for forming a phase-locked pulse by performing phase comparison with a pulse having a period corresponding to the reference pulse, and includes a ring oscillator for forming the plurality of pulses by shifting the phase-locked pulse on a unit time basis in a loop of said PLL circuit.

10. A circuit according to claim 8, wherein said pulse forming means is a ring oscillator which oscillates at a predetermined frequency in synchronism with the reference pulse signal, said oscillator being constituted by an odd number of logic inverting means connected in a ring form and controlled such that each inverting means has a predetermined unit delay time.

11. A circuit according to claim 10, wherein said selecting means outputs a delayed pulse having an arbitrary delay time of an integer multiple of the unit delay time by selecting one of output signals from said plurality of logic inverting means on the basis of the delay data.

12. A circuit according to claim 8, wherein an oscillation frequency of a ring oscillator is ½ a frequency of the reference pulse signal.

13. A driving circuit of a vibration type actuator for applying a driving signal to an electro-mechanical energy conversion means of a vibration member so as to excite vibration in the vibration member of said vibration type actuator, comprising:

pulse generating means for generating a plurality of pulse signals having a desired frequency and different phases, said pulse generating means being formed into a chip; and power amplification means for applying AC voltages obtained by amplifying power of the plurality of pulse signals to said electro-mechanical energy conversion means, said power amplification means being formed into a chip, wherein said chips are formed on one of metal heat radiation means, ceramic heat radiation means, and case-like heat radiation means, and electrodes used for applying the voltages are respectively provided for each of said chips on said one of radiation means.

14. A driving circuit of a vibration type actuator for applying a driving signal to an electro-mechanical energy conversion means of a vibration member so as to excite vibration in the vibration member of said vibration type actuator, comprising:

pulse generating means for generating a plurality of pulse signals having a desired frequency and different phases, said pulse generating means being formed into a chip;

control means for controlling said pulse generating means on the basis of an external command stored in advance, said control means being formed into a chip; and power amplification means for applying AC voltages obtained by amplifying power of the plurality of pulse signals to said electro-mechanical energy conversion means, said power amplification means being formed into a chip, wherein said chips are formed on one of metal heat radiation means, ceramic heat radiation means, and case-like heat radiation means, and electrodes used for applying the voltages are provided for said chips on said one of radiation means.

15. A driving circuit of a vibration type actuator for applying a driving signal to an electro-mechanical energy conversion means of a vibration member so as to excite vibration in the vibration member of said vibration type actuator, comprising:

pulse generating means for generating a plurality of pulse signals having a desired frequency and different phases;

detection means for detecting at least one of a driving state of said vibration type actuator and an operation state of said driving circuit;

control means for controlling said pulse generating means on the basis of an external command or a command stored in advance and an output from said detection means; and power amplification means for applying AC voltages obtained by amplifying power of the plurality of pulse signals to said electro-mechanical energy conversion means, wherein circuit elements constituting said pulse generating means, said detection means, and said control means are formed on one of metal heat radiation means, ceramic heat radiation means, and case-like heat radiation means.

16. A circuit according to claim 14, wherein said control means includes serial or parallel communication means for receiving an external command and transmitting internal information.

17. A circuit according to claim 14, wherein said control means stops outputting at least one of a plurality of pulse signals output from said pulse generating means on the basis of the external command or command stored in advance.

18. A circuit according to claim 15, wherein said detection means detects a temperature, and said control means stops an output from said power amplification means when said detection means detects that the temperature exceeds a predetermined temperature.

19. A circuit according to claim 18, wherein said detection means comprises at least one temperature detection means for detecting a temperature of said heat radiation means or said driving circuit for said vibration type actuator formed on said heat radiation means.

20. A circuit according to claim 13, wherein said power amplification means is a driver circuit formed as a full bridge circuit or half bridge circuit, said driver circuit includes a charge pump circuit for supplying a power source voltage for driving an N-channel switching element on a high side of said bridge circuit, and at least a diode element and a capacitor element of said charge pump circuit are not formed on said heat radiation means.

21. A vibration type actuator driving system in which driving circuits for applying driving signals to electro-mechanical energy conversion means of vibration members of vibration type actuators to excite vibration in said vibration members are respectively provided for said vibration type actuators so as to drive said vibration type actuators, comprising:

as components of each driving circuit, pulse generating means for generating a plurality of pulse signals having a desired frequency and different phases, control means for communicating with an external circuit, and power amplification means for applying AC voltages obtained by amplifying power of the plurality of pulse signals to said electro-mechanical energy conversion means wherein serial communication is performed between said control means and said external circuit to concurrently transfer a transmission signal for a command to said respective driving circuits, and reception signals for status checks from said respective driving circuits are sequentially sent to said external circuit, by connecting said driving circuits in series with each other, in the order of connection.

22. A vibration type actuator driving system in which driving circuits for applying driving signals to electro-mechanical energy conversion means of vibration members of vibration type actuators to excite vibration in said vibration members are respectively provided for said vibration type actuators so as to drive said vibration type actuators, comprising:

as components of each driving circuit, pulse generating means for generating a plurality of pulse signals having a desired frequency and different phases, control means for communicating with an external circuit, and power amplification means for applying AC voltages obtained by amplifying power of the plurality of pulse signals to said electro-mechanical energy conversion means, wherein parallel communication is performed between said control means and said external circuit, a transmission signal for a command and reception signals for status checks are connected in parallel with said respective driving circuits sharing the same signal line, and transmission and reception are switched in accordance with a communication direction switching signal output from said external circuit.

23. An apparatus according to claim 1, wherein all constituent elements of said driving circuit are formed on one silicon chip.

24. An apparatus according to claim 1, wherein all constituent elements of said driving circuit are formed on a plurality of silicon chips.

25. A system according to claim 23, wherein said silicon chip is encapsulated in a resin, and an external electrode extends outward from the resin.

* * * * *

UNITED STATES PATENT AND TRADEMARK OFFICE
CERTIFICATE OF CORRECTION

PATENT NO.  : 6,229,402 B1
DATED       : May 8, 2001
INVENTOR(S) : Kenichi Kataoka et al.

It is certified that error appears in the above-identified patent and that said Letters Patent is hereby corrected as shown below:

Title page,
Item [56], References Cited,
OTHER, insert -- European Search Report, Sept. 9, 1999 --.

Column 1,
Line 6, "relates" should read -- relates to --.
Line 29, "plurality" should read -- plurality of --.

Column 5,
Line 37, "SO" should read -- S0 --.

Column 6,
Line 8, "period" should read -- period of --.

Column 7,
Line 62, "trough" should read -- through --.

Column 10,
Line 60, "form" should read -- from --.

Column 12,
Line 22, "and." should read -- and --.

UNITED STATES PATENT AND TRADEMARK OFFICE
CERTIFICATE OF CORRECTION

PATENT NO. : 6,229,402 B1
DATED : May 8, 2001
INVENTOR(S) : Kenichi Kataoka et al.

It is certified that error appears in the above-identified patent and that said Letters Patent is hereby corrected as shown below:

Column 13,
Line 8, "an" should read -- and --.
Line 47, "An" should read -- A --.

Signed and Sealed this

Twelfth Day of March, 2002

Attest:

JAMES E. ROGAN
Attesting Officer  *Director of the United States Patent and Trademark Office*